(12) United States Patent
Green et al.

(10) Patent No.: US 10,437,317 B2
(45) Date of Patent: Oct. 8, 2019

(54) MICROCONTROLLER ARCHITECTURE FOR POWER FACTOR CORRECTION CONVERTER

(71) Applicant: Emerson Climate Technologies, Inc., Sidney, OH (US)

(72) Inventors: Charles E. Green, Fenton, MO (US); Joseph G. Marcinkiewicz, St. Peters, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 15/943,660

(22) Filed: Apr. 2, 2018

(65) Prior Publication Data

US 2018/0224922 A1  Aug. 9, 2018

Related U.S. Application Data

(63) Continuation of application No. 15/487,426, filed on Apr. 13, 2017, now Pat. No. 9,933,842, which is a
(Continued)

(51) Int. Cl.
*G06F 8/61* (2018.01)
*G06F 9/22* (2006.01)
(Continued)

(52) U.S. Cl.
CPC ............. *G06F 1/3287* (2013.01); *G06F 8/61* (2013.01); *G06F 8/654* (2018.02);
(Continued)

(58) Field of Classification Search
CPC ................................ G06F 1/3287; H02P 29/02
(Continued)

(56) References Cited

U.S. PATENT DOCUMENTS 4,388,578 A    6/1983   Green et al.
4,437,146 A    3/1984   Carpenter
(Continued)

FOREIGN PATENT DOCUMENTS

CN    103822334 A    5/2014
EP    0744816 A2    11/1996
(Continued)

OTHER PUBLICATIONS

International Search Report regarding International Application No. PCT/US2017/027691, dated Aug. 18, 2017.
(Continued)

*Primary Examiner* — David Luo
(74) *Attorney, Agent, or Firm* — Harness, Dickey & Pierce, P.L.C.

(57) ABSTRACT

A circuit for driving a motor of a compressor includes a microcontroller that generates a reference current value for a power factor correction (PFC) converter. A programmable logic device (PLD) receives control messages from the microcontroller. The PLD sets a value in an off-time register based on a control message from the microcontroller. The PLD controls a power switch of the PFC converter to turn off in response to receiving a comparison signal indicating that a measured current in the PFC converter exceeds the reference current value. Subsequent to controlling the power switch to turn off, the PLD waits for a period of time determined by the off-time register before controlling the power switch to turn on.

20 Claims, 11 Drawing Sheets

Related U.S. Application Data continuation-in-part of application No. 15/487,101, filed on Apr. 13, 2017, said application No. 15/487,426 is a continuation-in-part of application No. 15/487,151, filed on Apr. 13, 2017, said application No. 15/487,426 is a continuation-in-part of application No. 15/487,175, filed on Apr. 13, 2017, said application No. 15/487,426 is a continuation-in-part of application No. 15/487,027, filed on Apr. 13, 2017, now Pat. No. 10,284,132, said application No. 15/487,426 is a continuation-in-part of application No. 15/487,226, filed on Apr. 13, 2017, said application No. 15/487,426 is a continuation-in-part of application No. 15/487,201, filed on Apr. 13, 2017, now Pat. No. 10,075,065, said application No. 15/487,426 is a continuation-in-part of application No. 15/430,978, filed on Feb. 13, 2017, now Pat. No. 9,965,928, said application No. 15/487,426 is a continuation-in-part of application No. 15/419,349, filed on Jan. 30, 2017, said application No. 15/487,426 is a continuation-in-part of application No. 15/419,464, filed on Jan. 30, 2017, now Pat. No. 10,277,115, said application No. 15/487,426 is a continuation-in-part of application No. 15/419,423, filed on Jan. 30, 2017, said application No. 15/487,426 is a continuation-in-part of application No. 15/419,394, filed on Jan. 30, 2017, now Pat. No. 10,305,373.

(60) Provisional application No. 62/323,607, filed on Apr. 15, 2016, provisional application No. 62/323,563, filed on Apr. 15, 2016, provisional application No. 62/323,532, filed on Apr. 15, 2016, provisional application No. 62/398,641, filed on Sep. 23, 2016, provisional application No. 62/398,658, filed on Sep. 23, 2016, provisional application No. 62/323,498, filed on Apr. 15, 2016, provisional application No. 62/323,505, filed on Apr. 15, 2016, provisional application No. 62/398,668, filed on Sep. 23, 2016, provisional application No. 62/323,519, filed on Apr. 15, 2016, provisional application No. 62/323,588, filed on Apr. 15, 2016, provisional application No. 62/323,517, filed on Apr. 15, 2016, provisional application No. 62/323,538, filed on Apr. 15, 2016, provisional application No. 62/323,527, filed on Apr. 15, 2016.

(51) Int. Cl.

| | | |
|---|---|---|
| *H02M 1/00* | (2006.01) | |
| *H02M 1/32* | (2007.01) | |
| *H02M 1/36* | (2007.01) | |
| *H02M 1/42* | (2007.01) | |
| *G06F 12/02* | (2006.01) | |
| *G06F 13/40* | (2006.01) | |
| *G06F 13/42* | (2006.01) | |
| *G06F 8/654* | (2018.01) | |
| *H02P 23/26* | (2016.01) | |
| *H02P 29/02* | (2016.01) | |
| *G06F 1/3287* | (2019.01) | |
| *G05B 19/042* | (2006.01) | |

(52) U.S. Cl.
CPC ...... *G06F 13/4022* (2013.01); *G06F 13/4282* (2013.01); *H02M 1/32* (2013.01); *H02M 1/42* (2013.01); *H02M 1/4225* (2013.01); *H02P 23/26* (2016.02); *H02P 29/02* (2013.01); *G05B 19/042* (2013.01); *G05B 2219/2614* (2013.01); *G06F 9/223* (2013.01); *G06F 12/0246* (2013.01); *G06F 2212/7201* (2013.01); *H02M 1/36* (2013.01); *H02M 2001/0012* (2013.01); *H02M 2001/327* (2013.01); *H02M 2001/4291* (2013.01); *Y02B 70/126* (2013.01); *Y02D 10/42* (2018.01)

(58) Field of Classification Search
USPC .................................................. 318/729, 727
See application file for complete search history.

(56) References Cited

U.S. PATENT DOCUMENTS

| | | |
|---|---|---|
| 4,504,922 A | 3/1985 | Johnson et al. |
| 4,939,473 A | 7/1990 | Eno |
| 5,367,617 A | 11/1994 | Goossen et al. |
| 5,410,360 A | 4/1995 | Montgomery |
| 5,493,101 A | 2/1996 | Innes |
| 5,506,484 A | 4/1996 | Munro et al. |
| 5,583,420 A | 12/1996 | Rice et al. |
| 5,594,635 A | 1/1997 | Gegner |
| 5,600,233 A | 2/1997 | Warren et al. |
| 5,754,036 A | 5/1998 | Walker |
| 5,801,516 A | 9/1998 | Rice et al. |
| 5,823,004 A | 10/1998 | Polley et al. |
| 5,903,130 A | 5/1999 | Rice et al. |
| 6,018,200 A | 1/2000 | Anderson et al. |
| 6,031,749 A | 2/2000 | Covington et al. |
| 6,115,051 A | 9/2000 | Simons et al. |
| 6,137,253 A | 10/2000 | Galbiati et al. |
| 6,158,887 A | 12/2000 | Simpson |
| 6,169,670 B1 | 1/2001 | Okubo et al. |
| 6,181,587 B1 | 1/2001 | Kuramoto et al. |
| 6,188,203 B1 | 2/2001 | Rice et al. |
| 6,215,287 B1 | 4/2001 | Matsushiro et al. |
| 6,239,523 B1 | 5/2001 | Janicek et al. |
| 6,249,104 B1 | 6/2001 | Janicek |
| 6,281,658 B1 | 8/2001 | Han et al. |
| 6,282,910 B1 | 9/2001 | Helt |
| 6,295,215 B1 | 9/2001 | Faria et al. |
| 6,307,759 B1 | 10/2001 | Inarida et al. |
| 6,309,385 B1 | 10/2001 | Simpson |
| 6,313,602 B1 | 11/2001 | Arefeen et al. |
| 6,384,579 B2 | 5/2002 | Watanabe |
| 6,433,504 B1 | 8/2002 | Branecky |
| 6,437,997 B1 | 8/2002 | Inarida et al. |
| 6,476,663 B1 | 11/2002 | Gauthier et al. |
| 6,483,265 B1 | 11/2002 | Hollenbeck et al. |
| 6,498,451 B1 | 12/2002 | Boules et al. |
| 6,515,437 B1 | 2/2003 | Zinkler et al. |
| 6,556,462 B1 | 4/2003 | Steigerwald et al. |
| 6,586,904 B2 | 7/2003 | McClelland et al. |
| 6,593,881 B2 | 7/2003 | Vail et al. |
| 6,629,776 B2 | 10/2003 | Bell et al. |
| 6,693,407 B2 | 2/2004 | Atmur |
| 6,693,409 B2 | 2/2004 | Lynch et al. |
| 6,710,573 B2 | 3/2004 | Kadah |
| 6,717,457 B2 | 4/2004 | Nanba et al. |
| 6,737,833 B2 | 5/2004 | Kalman et al. |
| 6,781,802 B2 | 8/2004 | Kato et al. |
| 6,801,028 B2 | 10/2004 | Kernahan et al. |
| 6,806,676 B2 | 10/2004 | Papiernik et al. |
| 6,810,292 B1 | 10/2004 | Rappenecker et al. |
| 6,859,008 B1 | 2/2005 | Seibel |
| 6,885,161 B2 | 4/2005 | de Nanclares et al. |
| 6,885,568 B2 | 4/2005 | Kernahan et al. |
| 6,900,607 B2 | 5/2005 | Kleinau et al. |
| 6,902,117 B1 | 6/2005 | Rosen |
| 6,906,500 B2 | 6/2005 | Kernahan |
| 6,906,933 B2 | 6/2005 | Taimela |
| 6,909,266 B2 | 6/2005 | Kernahan et al. |
| 6,930,459 B2 | 8/2005 | Fritsch et al. |
| 6,949,915 B2 | 9/2005 | Stanley |
| 6,952,089 B2 | 10/2005 | Matsuo |
| 6,961,015 B2 | 11/2005 | Kernahan et al. |
| 6,979,967 B2 | 12/2005 | Ho |

(56) References Cited

U.S. PATENT DOCUMENTS

| | | |
|---|---|---|
| 6,979,987 B2 | 12/2005 | Kernahan et al. |
| 6,984,948 B2 | 1/2006 | Nakata et al. |
| 7,015,679 B2 | 3/2006 | Ryba et al. |
| 7,053,569 B2 | 5/2006 | Takahashi et al. |
| 7,061,195 B2 | 6/2006 | Ho et al. |
| 7,068,016 B2 | 6/2006 | Athari |
| 7,068,191 B2 | 6/2006 | Kuner et al. |
| 7,071,641 B2 | 7/2006 | Arai et al. |
| 7,081,733 B2 | 7/2006 | Han et al. |
| 7,112,940 B2 | 9/2006 | Shimozono et al. |
| 7,135,830 B2 | 11/2006 | El-Ibiary |
| 7,148,664 B2 | 12/2006 | Takahashi et al. |
| 7,149,644 B2 | 12/2006 | Kobayashi et al. |
| 7,154,238 B2 | 12/2006 | Kinukawa et al. |
| 7,164,590 B2 | 1/2007 | Li et al. |
| 7,176,644 B2 | 2/2007 | Ueda et al. |
| 7,180,273 B2 | 2/2007 | Bocchiola et al. |
| 7,181,923 B2 | 2/2007 | Kurita et al. |
| 7,193,383 B2 | 3/2007 | Sarlioglu et al. |
| 7,202,626 B2 | 4/2007 | Jadric et al. |
| 7,208,891 B2 | 4/2007 | Jadric et al. |
| 7,221,121 B2 | 5/2007 | Skaug et al. |
| 7,239,257 B1 | 7/2007 | Alexander et al. |
| 7,256,564 B2 | 8/2007 | MacKay |
| 7,274,241 B2 | 9/2007 | Ho et al. |
| 7,309,977 B2 | 12/2007 | Gray et al. |
| 7,330,011 B2 | 2/2008 | Ueda et al. |
| 7,336,514 B2 | 2/2008 | Amarillas et al. |
| 7,339,346 B2 | 3/2008 | Ta et al. |
| 7,358,706 B2 | 4/2008 | Lys |
| 7,359,224 B2 | 4/2008 | Li |
| 7,425,806 B2 | 9/2008 | Schnetzka et al. |
| 7,459,864 B2 | 12/2008 | Lys |
| 7,463,006 B2 | 12/2008 | Ta et al. |
| 7,495,404 B2 | 2/2009 | Sarlioglu et al. |
| 7,508,688 B2 | 3/2009 | Virolainen |
| 7,532,491 B2 | 5/2009 | Lim et al. |
| 7,573,275 B2 | 8/2009 | Inagaki et al. |
| 7,592,820 B2 | 9/2009 | Laakso et al. |
| 7,598,698 B2 | 10/2009 | Hashimoto et al. |
| 7,612,522 B2 | 11/2009 | Williams et al. |
| 7,613,018 B2 | 11/2009 | Lim et al. |
| 7,616,466 B2 | 11/2009 | Chakrabarti et al. |
| 7,633,249 B2 | 12/2009 | Sekimoto et al. |
| 7,650,760 B2 | 1/2010 | Nakata et al. |
| 7,659,678 B2 | 2/2010 | Maiocchi |
| 7,667,986 B2 | 2/2010 | Artusi et al. |
| 7,671,557 B2 | 3/2010 | Maeda et al. |
| 7,675,759 B2 | 3/2010 | Artusi et al. |
| 7,723,964 B2 | 5/2010 | Taguchi |
| 7,750,595 B2 | 7/2010 | Yamada et al. |
| 7,771,115 B2 | 8/2010 | Pan |
| 7,847,507 B2 | 12/2010 | Wagoner |
| 7,880,430 B2 | 2/2011 | Gale et al. |
| 7,888,922 B2 | 2/2011 | Melanson |
| 7,903,441 B2 | 3/2011 | Chen et al. |
| 7,952,293 B2 | 5/2011 | Kelly |
| 7,966,079 B2 | 6/2011 | Graves |
| 7,966,081 B2 | 6/2011 | Graves |
| 8,032,323 B2 | 10/2011 | Taylor |
| 8,040,703 B2 | 10/2011 | Melanson |
| 8,044,623 B2 | 10/2011 | Takeuchi et al. |
| 8,050,063 B2 | 11/2011 | Wagoner et al. |
| 8,054,033 B2 | 11/2011 | Kern et al. |
| 8,065,023 B2 | 11/2011 | Graves |
| 8,072,170 B2 | 12/2011 | Hwang et al. |
| 8,092,084 B2 | 1/2012 | Riddle et al. |
| 8,096,139 B2 | 1/2012 | Taras et al. |
| 8,120,299 B2 | 2/2012 | Hwang et al. |
| 8,130,522 B2 | 3/2012 | Maksimovic |
| 8,154,230 B2 | 4/2012 | Kimura |
| 8,164,292 B2 | 4/2012 | Park |
| 8,169,180 B2 | 5/2012 | Hwang et al. |
| 8,174,853 B2 | 5/2012 | Kane et al. |
| 8,182,245 B2 | 5/2012 | Maeda et al. |
| 8,193,756 B2 | 6/2012 | Jadric et al. |
| 8,223,508 B2 | 7/2012 | Baarman et al. |
| 8,228,700 B2 | 7/2012 | Yahata et al. |
| 8,264,192 B2 | 9/2012 | Green et al. |
| 8,264,860 B2 | 9/2012 | Green |
| 8,269,370 B2 | 9/2012 | Haga |
| 8,278,778 B2 | 10/2012 | Rockenfeller et al. |
| 8,288,985 B2 | 10/2012 | Takahashi |
| 8,292,503 B2 | 10/2012 | Pan |
| 8,299,653 B2 | 10/2012 | Rockenfeller et al. |
| 8,305,780 B2 | 11/2012 | Saruwatari et al. |
| 8,320,145 B2 | 11/2012 | Horii |
| 8,321,039 B2 | 11/2012 | Graves |
| 8,335,095 B2 | 12/2012 | Mi et al. |
| 8,344,638 B2 | 1/2013 | Shteynberg et al. |
| 8,345,454 B1 | 1/2013 | Krolak et al. |
| 8,358,098 B2 * | 1/2013 | Skinner ............... H02M 1/4208 307/98 |
| 8,395,874 B2 | 3/2013 | Yamai et al. |
| 8,400,089 B2 | 3/2013 | Bonner et al. |
| 8,406,021 B2 | 3/2013 | Green |
| 8,432,108 B2 | 4/2013 | Kelly et al. |
| 8,432,713 B2 | 4/2013 | Popescu et al. |
| 8,467,197 B2 | 6/2013 | Perisic et al. |
| 8,477,514 B2 | 7/2013 | Artusi et al. |
| 8,477,517 B2 | 7/2013 | Joshi |
| 8,487,601 B2 | 7/2013 | Saint-Pierre |
| 8,493,014 B2 | 7/2013 | Henderson et al. |
| 8,508,165 B2 | 8/2013 | Shinomoto et al. |
| 8,508,166 B2 | 8/2013 | Marcinkiewicz et al. |
| 8,520,415 B1 | 8/2013 | Krishnamoorthy et al. |
| 8,520,420 B2 | 8/2013 | Jungreis et al. |
| 8,547,024 B2 | 10/2013 | Grotkowski et al. |
| 8,547,713 B2 | 10/2013 | Kono et al. |
| 8,564,982 B2 | 10/2013 | Song et al. |
| 8,582,263 B2 | 11/2013 | Butler |
| 8,587,962 B2 | 11/2013 | Perisic et al. |
| 8,599,577 B2 | 12/2013 | Kajouke et al. |
| 8,614,562 B2 | 12/2013 | Bouchez et al. |
| 8,633,668 B2 | 1/2014 | Marcoccia |
| 8,638,074 B2 | 1/2014 | Babcock et al. |
| 8,648,558 B2 | 2/2014 | Clothier et al. |
| 8,657,585 B2 | 2/2014 | Hong et al. |
| 8,669,805 B2 | 3/2014 | Serventi et al. |
| 8,693,228 B2 | 4/2014 | Matan et al. |
| 8,698,433 B2 | 4/2014 | Green |
| 8,704,409 B2 | 4/2014 | Owens |
| 8,736,207 B2 | 5/2014 | Ritter et al. |
| 8,749,222 B2 | 6/2014 | Williams |
| 8,751,374 B2 | 6/2014 | Graves |
| 8,760,089 B2 | 6/2014 | Smith |
| 8,760,096 B2 | 6/2014 | Inamura et al. |
| 8,767,418 B2 | 7/2014 | Jungreis et al. |
| 8,773,052 B2 | 7/2014 | Clothier et al. |
| 8,796,967 B2 | 8/2014 | Sato |
| 8,817,506 B2 | 8/2014 | Shimomugi et al. |
| 8,823,292 B2 | 9/2014 | Sumi et al. |
| 8,829,976 B2 | 9/2014 | Kuwabara et al. |
| 8,836,253 B2 | 9/2014 | Kato et al. |
| 8,847,503 B2 | 9/2014 | Chang et al. |
| 8,866,459 B2 | 10/2014 | Zilberberg |
| 8,884,560 B2 | 11/2014 | Ito |
| 8,896,248 B2 | 11/2014 | Becerra et al. |
| 8,928,262 B2 | 1/2015 | Chretien |
| 8,933,654 B2 | 1/2015 | Chen et al. |
| 8,937,821 B2 | 1/2015 | Amano et al. |
| 8,941,347 B2 | 1/2015 | Otorii et al. |
| 8,941,365 B2 | 1/2015 | Murdock et al. |
| 8,976,551 B2 | 3/2015 | Igarashi et al. |
| 9,020,731 B2 | 4/2015 | Yamada |
| 9,030,143 B2 | 5/2015 | Guzelgunler |
| 9,065,365 B2 | 6/2015 | Omata et al. |
| 9,065,367 B2 | 6/2015 | Greetham |
| 9,070,224 B1 | 6/2015 | Esfahbod MirHosseinZadeh Sarabi et al. |
| 9,071,186 B2 | 6/2015 | Wu et al. |
| 9,088,232 B2 | 7/2015 | Marcinkiewicz et al. |
| 9,088,237 B2 | 7/2015 | Sanchez et al. |
| 9,093,941 B2 | 7/2015 | Lawrence et al. |

(56) References Cited

U.S. PATENT DOCUMENTS

| | | |
|---|---|---|
| 9,100,019 B2 | 8/2015 | Akiyama |
| 9,109,959 B2 | 8/2015 | Nieddu et al. |
| 9,118,260 B2 | 8/2015 | Gautier et al. |
| 9,124,095 B1 | 9/2015 | Barron et al. |
| 9,124,200 B2 | 9/2015 | Dai |
| 9,130,493 B2 | 9/2015 | Chen et al. |
| 9,134,183 B2 | 9/2015 | Jeong et al. |
| 9,136,757 B2 | 9/2015 | Arisawa et al. |
| 9,136,790 B2 | 9/2015 | Park et al. |
| 9,154,061 B2 * | 10/2015 | Green .................. H02P 6/20 |
| 9,185,768 B2 | 11/2015 | Navabi-Shirazi et al. |
| 9,188,491 B2 | 11/2015 | Pan |
| 9,190,926 B2 | 11/2015 | Taguchi |
| 9,197,132 B2 | 11/2015 | Artusi et al. |
| 9,214,881 B2 | 12/2015 | Sekimoto et al. |
| 9,225,258 B2 | 12/2015 | Shimomugi et al. |
| 9,225,284 B2 | 12/2015 | Ried |
| 9,240,739 B2 | 1/2016 | Fukuta et al. |
| 9,246,398 B2 | 1/2016 | Sakakibara et al. |
| 9,246,418 B2 | 1/2016 | Becker et al. |
| 9,247,608 B2 | 1/2016 | Chitta et al. |
| 9,250,299 B1 | 2/2016 | Yarlagadda et al. |
| 9,257,931 B2 | 2/2016 | Tooyama et al. |
| 9,300,241 B2 | 3/2016 | Becerra et al. |
| 9,312,780 B2 | 4/2016 | Taguchi |
| 9,322,717 B1 | 4/2016 | Dhaliwal et al. |
| 9,322,867 B2 | 4/2016 | Chatroux et al. |
| 9,325,517 B2 | 4/2016 | Grohman |
| 9,331,598 B2 | 5/2016 | Jeong et al. |
| 9,331,614 B2 | 5/2016 | Becerra et al. |
| 9,387,800 B2 | 7/2016 | Tran |
| 9,407,093 B2 | 8/2016 | Cummings |
| 9,407,135 B2 | 8/2016 | Kinomura et al. |
| 9,419,513 B2 | 8/2016 | Mao et al. |
| 9,425,610 B2 | 8/2016 | Nakashita et al. |
| 9,431,915 B2 | 8/2016 | Arisawa et al. |
| 9,431,923 B2 | 8/2016 | Harada et al. |
| 9,438,029 B2 | 9/2016 | Cameron |
| 9,444,331 B2 | 9/2016 | Carletti et al. |
| 9,461,577 B2 | 10/2016 | Ried |
| 9,479,070 B2 | 10/2016 | van der Merwe |
| 9,502,981 B2 | 11/2016 | Schaemann et al. |
| 9,504,105 B2 | 11/2016 | Ekbote et al. |
| 9,560,718 B2 | 1/2017 | Sadwick |
| 9,564,846 B2 | 2/2017 | Marcinkiewicz et al. |
| 9,564,848 B2 | 2/2017 | Ishizeki et al. |
| 9,565,731 B2 | 2/2017 | DeJonge |
| 9,577,534 B2 | 2/2017 | Ishizeki et al. |
| 9,580,858 B2 | 2/2017 | Maekawa et al. |
| 9,581,626 B2 | 2/2017 | Schwind |
| 9,595,889 B2 | 3/2017 | Li et al. |
| 9,618,249 B2 | 4/2017 | Hatakeyama et al. |
| 9,621,101 B2 | 4/2017 | Kane |
| 9,625,190 B2 | 4/2017 | Lee et al. |
| 9,634,602 B2 | 4/2017 | Hou et al. |
| 9,640,617 B2 | 5/2017 | Das et al. |
| 9,641,063 B2 | 5/2017 | Ramabhadran et al. |
| 9,641,115 B2 | 5/2017 | Chretien |
| 9,654,048 B2 | 5/2017 | West et al. |
| 9,667,169 B2 | 5/2017 | Nawa et al. |
| 9,683,904 B2 | 6/2017 | Matsumoto et al. |
| 9,692,312 B2 * | 6/2017 | Yuasa et al. |
| 9,692,332 B2 | 6/2017 | Taoka et al. |
| 9,696,693 B2 | 7/2017 | Element |
| 9,698,768 B2 | 7/2017 | Leong et al. |
| 9,712,071 B2 | 7/2017 | Yuasa et al. |
| 9,715,913 B1 | 7/2017 | Yin et al. |
| 9,722,488 B2 | 8/2017 | Ishizeki et al. |
| 9,732,991 B2 | 8/2017 | An et al. |
| 9,741,182 B2 | 8/2017 | Zhu |
| 9,742,319 B2 | 8/2017 | Marvelly et al. |
| 9,742,346 B2 | 8/2017 | Esnault |
| 9,746,812 B2 | 8/2017 | Kosaka |
| 9,762,119 B2 | 9/2017 | Kim et al. |
| 9,772,131 B2 | 9/2017 | Hatakeyama et al. |
| 9,772,381 B2 | 9/2017 | Bock et al. |
| 9,780,683 B2 | 10/2017 | Sakakibara et al. |
| 9,787,175 B2 | 10/2017 | Phadke |
| 9,787,246 B2 | 10/2017 | Tsumura et al. |
| 9,791,327 B2 | 10/2017 | Rhee et al. |
| 9,800,138 B2 | 10/2017 | Katsumata |
| 9,813,000 B2 | 11/2017 | Jabusch et al. |
| 9,816,743 B2 | 11/2017 | Nakase et al. |
| 9,819,294 B2 | 11/2017 | Park et al. |
| 9,823,105 B2 | 11/2017 | Lehmkuhl et al. |
| 9,829,226 B2 | 11/2017 | Hatakeyama et al. |
| 9,829,234 B2 | 11/2017 | Hatakeyama et al. |
| 9,837,952 B1 | 12/2017 | Carcia et al. |
| 9,839,103 B2 | 12/2017 | Avrahamy |
| 9,852,559 B2 | 12/2017 | Rettig et al. |
| 9,853,559 B2 | 12/2017 | Taniguchi et al. |
| 9,867,263 B2 | 1/2018 | Avrahamy |
| 9,870,009 B2 | 1/2018 | Erwin et al. |
| 9,882,466 B2 | 1/2018 | Kondo et al. |
| 9,888,535 B2 | 2/2018 | Chitta et al. |
| 9,888,540 B2 | 2/2018 | DeJonge |
| 9,893,522 B2 | 2/2018 | Wallace et al. |
| 9,893,603 B2 | 2/2018 | Nishizawa et al. |
| 9,893,668 B2 | 2/2018 | Hart et al. |
| 9,899,916 B2 | 2/2018 | Okamura et al. |
| 9,929,636 B2 | 3/2018 | Shinomoto et al. |
| 9,935,569 B2 | 4/2018 | Tsumura et al. |
| 9,935,571 B2 | 4/2018 | Frampton et al. |
| 9,941,834 B2 | 4/2018 | Tsukano et al. |
| 9,954,473 B2 | 4/2018 | Je et al. |
| 9,954,475 B2 | 4/2018 | Cho et al. |
| 9,965,928 B2 | 5/2018 | Green |
| 9,973,129 B2 | 5/2018 | Schuster et al. |
| 9,998,049 B2 | 6/2018 | Kashima et al. |
| 10,003,277 B2 | 6/2018 | Taguchi et al. |
| 10,014,858 B2 | 7/2018 | Flynn et al. |
| 2002/0085468 A1 | 7/2002 | Kobayashi |
| 2003/0021127 A1 | 1/2003 | Loef et al. |
| 2003/0117818 A1 | 6/2003 | Ota |
| 2003/0218448 A1 | 11/2003 | Lidak et al. |
| 2004/0136208 A1 | 7/2004 | Agarwal et al. |
| 2004/0183513 A1 | 9/2004 | Vinciarelli |
| 2005/0017695 A1 | 1/2005 | Stanley |
| 2005/0017699 A1 | 1/2005 | Stanley |
| 2005/0028539 A1 | 2/2005 | Singh et al. |
| 2005/0068337 A1 | 3/2005 | Duarte et al. |
| 2005/0076659 A1 | 4/2005 | Wallace et al. |
| 2005/0109047 A1 | 5/2005 | Park et al. |
| 2005/0122082 A1 | 6/2005 | Eckardt |
| 2006/0022648 A1 | 2/2006 | Ben-Yaakov et al. |
| 2006/0245219 A1 | 11/2006 | Li |
| 2007/0036212 A1 | 2/2007 | Leung et al. |
| 2007/0217233 A1 | 9/2007 | Lim et al. |
| 2008/0104983 A1 | 5/2008 | Yamai et al. |
| 2008/0115512 A1 | 5/2008 | Rizzo |
| 2008/0122418 A1 | 5/2008 | Briere et al. |
| 2008/0272748 A1 | 11/2008 | Melanson |
| 2008/0310201 A1 | 12/2008 | Maksimovic |
| 2009/0178424 A1 | 7/2009 | Hwang et al. |
| 2009/0273297 A1 | 11/2009 | Kelly |
| 2010/0117545 A1 | 5/2010 | Kelly et al. |
| 2010/0253295 A1 | 10/2010 | Tan et al. |
| 2010/0309700 A1 | 12/2010 | Maeda et al. |
| 2011/0012526 A1 | 1/2011 | Kelly |
| 2011/0015788 A1 | 1/2011 | Celik et al. |
| 2011/0030396 A1 | 2/2011 | Marcinkiewicz et al. |
| 2011/0030398 A1 | 2/2011 | Marcinkiewicz et al. |
| 2011/0031911 A1 | 2/2011 | Marcinkiewicz et al. |
| 2011/0031920 A1 | 2/2011 | Henderson et al. |
| 2011/0031942 A1 | 2/2011 | Green |
| 2011/0031943 A1 | 2/2011 | Green |
| 2011/0034176 A1 | 2/2011 | Lord et al. |
| 2011/0141774 A1 | 6/2011 | Kane et al. |
| 2011/0164339 A1 | 7/2011 | Schmid et al. |
| 2011/0204820 A1 | 8/2011 | Tikkanen et al. |
| 2011/0205161 A1 | 8/2011 | Myers et al. |
| 2011/0304279 A1 | 12/2011 | Felty |
| 2012/0013282 A1 | 1/2012 | Introwicz |
| 2012/0075310 A1 | 3/2012 | Michail et al. |

(56) References Cited

U.S. PATENT DOCUMENTS

| | | |
|---|---|---|
| 2012/0153396 A1 | 6/2012 | Sugiura et al. |
| 2012/0153916 A1 | 6/2012 | Weinstein et al. |
| 2012/0179299 A1 | 7/2012 | Gyota et al. |
| 2012/0280637 A1 | 11/2012 | Tikkanen et al. |
| 2012/0313646 A1 | 12/2012 | Nishikawa |
| 2013/0010508 A1 | 1/2013 | Courtel |
| 2013/0020310 A1 | 1/2013 | Hacham |
| 2013/0182470 A1 | 7/2013 | Chen et al. |
| 2014/0001993 A1 | 1/2014 | Iwata et al. |
| 2014/0015463 A1 | 1/2014 | Merkel et al. |
| 2014/0077770 A1 | 3/2014 | Omoto et al. |
| 2014/0091622 A1 | 4/2014 | Lucas et al. |
| 2014/0169046 A1 | 6/2014 | Chen |
| 2014/0292212 A1 | 10/2014 | Gray et al. |
| 2015/0043252 A1 | 2/2015 | Kuang |
| 2015/0084563 A1 | 3/2015 | Lucas et al. |
| 2015/0191133 A1 | 7/2015 | Okamura et al. |
| 2015/0214833 A1 | 7/2015 | Ramabhadran et al. |
| 2015/0219503 A1 | 8/2015 | Yoshida |
| 2015/0229204 A1 | 8/2015 | Mao et al. |
| 2015/0236581 A1 | 8/2015 | Chen et al. |
| 2015/0285691 A1 | 10/2015 | Caffee et al. |
| 2015/0326107 A1 | 11/2015 | Hsiao et al. |
| 2015/0333633 A1 | 11/2015 | Chen et al. |
| 2015/0354870 A1 | 12/2015 | Lee et al. |
| 2015/0365034 A1 | 12/2015 | Marcinkiewicz et al. |
| 2016/0013740 A1 | 1/2016 | Skinner et al. |
| 2016/0043632 A1 | 2/2016 | Tomioka |
| 2016/0043633 A1 | 2/2016 | Phadke |
| 2016/0094039 A1 | 3/2016 | Winstanley et al. |
| 2016/0133411 A1 | 5/2016 | Bock et al. |
| 2016/0218624 A1 | 7/2016 | Ishizeki et al. |
| 2016/0248365 A1 | 8/2016 | Ishizeki et al. |
| 2016/0261217 A1 | 9/2016 | Tang |
| 2016/0263331 A1 | 9/2016 | Nessel et al. |
| 2016/0268839 A1 | 9/2016 | Mouridsen |
| 2016/0268949 A1 | 9/2016 | Benn |
| 2016/0268951 A1 | 9/2016 | Cho et al. |
| 2016/0320249 A1 | 11/2016 | Reiman et al. |
| 2016/0329716 A1 | 11/2016 | Inoue |
| 2017/0141709 A1 | 5/2017 | Fukuda et al. |
| 2017/0141717 A1 | 5/2017 | Winstanley et al. |
| 2017/0155347 A1 | 6/2017 | Park et al. |
| 2017/0190530 A1 | 7/2017 | Seki et al. |
| 2017/0201201 A1 | 7/2017 | Aoki et al. |
| 2017/0205103 A1 | 7/2017 | Newcomb |
| 2017/0214341 A1 | 7/2017 | Matthews et al. |
| 2017/0244325 A1 | 8/2017 | Carralero et al. |
| 2017/0264223 A1 | 9/2017 | Kitano et al. |
| 2017/0287721 A1 | 10/2017 | Wood |
| 2017/0288561 A1 | 10/2017 | Lemberg et al. |
| 2017/0299444 A1 | 10/2017 | Green |
| 2017/0300107 A1 | 10/2017 | Green et al. |
| 2017/0302158 A1 | 10/2017 | Green |
| 2017/0302159 A1 | 10/2017 | Green et al. |
| 2017/0302160 A1 | 10/2017 | Marcinkiewicz et al. |
| 2017/0302161 A1 | 10/2017 | Green |
| 2017/0302162 A1 | 10/2017 | Green |
| 2017/0302165 A1 | 10/2017 | Marcinkiewicz et al. |
| 2017/0302200 A1 | 10/2017 | Marcinkiewicz |
| 2017/0302212 A1 | 10/2017 | Marcinkiewicz et al. |
| 2017/0302214 A1 | 10/2017 | Marcinkiewicz et al. |
| 2017/0317623 A1 | 11/2017 | Taniguchi et al. |
| 2017/0317637 A1 | 11/2017 | VanEyll et al. |
| 2017/0324362 A1 | 11/2017 | Colangelo et al. |
| 2017/0328786 A1 | 11/2017 | Takechi |
| 2017/0373629 A1 | 12/2017 | Shin et al. |
| 2018/0026544 A1 | 1/2018 | Baumann et al. |
| 2018/0034403 A1 | 2/2018 | Kim et al. |
| 2018/0062551 A1 | 3/2018 | Moon et al. |
| 2018/0073934 A1 | 3/2018 | Horng et al. |
| 2018/0076748 A1 | 3/2018 | Yamasaki et al. |
| 2018/0082991 A1 | 3/2018 | Toyoda et al. |
| 2018/0091075 A1 | 3/2018 | Musil |
| 2018/0094512 A1 | 4/2018 | Sadilek et al. |
| 2018/0175752 A1 | 6/2018 | Takeoka et al. |
| 2018/0180490 A1 | 6/2018 | Barbier et al. |
| 2018/0191261 A1 | 7/2018 | Chung et al. |
| 2018/0191288 A1 | 7/2018 | Li et al. |

FOREIGN PATENT DOCUMENTS

| | | |
|---|---|---|
| EP | 1271067 A1 | 1/2003 |
| EP | 1641113 A1 | 3/2006 |
| JP | H11237427 A | 8/1999 |
| JP | 2006134607 A | 5/2006 |
| JP | 2010541256 A | 12/2010 |
| JP | 2011160508 A | 8/2011 |
| JP | 2015080316 A | 4/2015 |
| KR | 20040025420 A | 3/2004 |
| KR | 20130067440 A | 6/2013 |
| WO | WO-2007035407 A1 | 3/2007 |
| WO | WO-2010143239 A1 | 12/2010 |
| WO | WO-2011074972 A1 | 6/2011 |

OTHER PUBLICATIONS

Written Opinion of the International Searching Authority regarding International Application No. PCT/US2017/027691, dated Aug. 18, 2017.

International Search Report regarding International Application No. PCT/US2017/027744, dated Aug. 18, 2017.

Written Opinion of the International Searching Authority regarding International Application No. PCT/US2017/027744, dated Aug. 18, 2017.

International Search Report regarding International Application No. PCT/US2017/027738, dated Aug. 18, 2017.

Written Opinion of the International Searching Authority regarding International Application No. PCT/US2017/027738, dated Aug. 18, 2017.

Office Action regarding U.S. Appl. No. 15/419,394, dated Sep. 11, 2017.

International Search Report regarding International Application No. PCT/US2017/027726, dated Sep. 12, 2017.

Written Opinion of the International Searching Authority regarding International Application No. PCT/US2017/027726, dated Sep. 12, 2017.

International Search Report regarding International Application No. PCT/US2017/027729, dated Sep. 13, 2017.

Written Opinion of the International Searching Authority regarding International Application No. PCT/US2017/027729, dated Sep. 13, 2017.

International Search Report regarding International Application No. PCT/US2017/027710, dated Sep. 20, 2017.

Written Opinion of the International Searching Authority regarding International Application No. PCT/US2017/027710, dated Sep. 20, 2017.

Amit Kumar Sinha et al. "SEPIC Based PFC Converter for PMBLDCM Drive in Air Conditioning System." International Journal of Advanced Computer Research, vol. 3, No. 1, Issue 8. Mar. 2013.

International Search Report regarding International Application No. PCT/US2017/027721, dated Sep. 20, 2017.

Written Opinion of the International Searching Authority regarding International Application No. PCT/US2017/027721, dated Sep. 20, 2017.

International Search Report regarding International Application No. PCT/US2017/027699, dated Sep. 20, 2017.

Written Opinion of the International Searching Authority regarding International Application No. PCT/US2017/027699, dated Sep. 20, 2017.

Applicant-Initiated Interview Summary regarding U.S. Appl. No. 15/419,394, dated Oct. 30, 2017.

Office Action regarding U.S. Appl. No. 15/419,394, dated Dec. 7, 2017.

Office Action regarding U.S. Appl. 15/419,464 dated Dec. 29, 2017.

Office Action regarding U.S. Appl. No. 15/419,423 dated Jan. 8, 2018.

(56) References Cited

OTHER PUBLICATIONS

Office Action regarding U.S. Appl. No. 15/487,201 dated Jan. 9, 2018.
Interview Summary regarding U.S. Appl. No. 15/419,394 dated Jan. 29, 2018.
Interview Summary regarding U.S. Appl. No. 15/419,423 dated Feb. 21, 2018.
Notice of Allowance regarding U.S. Appl. No. 15/430,978 dated Feb. 22, 2018.
Applicant-Initiated Interview Summary regarding U.S. Appl. No. 15/487,201 dated Mar. 5, 2018.
Advisory Action regarding U.S. Appl. No. 15/419,394 dated Mar. 12, 2018.
Restriction Requirement regarding U.S. Appl. No. 15/487,226 dated Mar. 12, 2018.
Restriction Requirement regarding U.S. Appl. No. 15/487,151 dated Apr. 5, 2018.
Non-Final Office Action regarding U.S. Appl. No. 15/487,101 dated Apr. 9, 2018.
Final Office Action regarding U.S. Appl. No. 15/487,201 dated Apr. 19, 2018.
Non-Final Office Action regarding U.S. Appl. No. 15/419,423 dated May 14, 2018.
Notice of Allowance regarding U.S. Appl. No. 15/419,464 dated May 11, 2018.
Notice of Allowance regarding U.S. Appl. No. 15/419,394 dated May 11, 2018.
Applicant-Initiated Interview Summary regarding U.S. Appl. No. 15/487,201 dated May 30, 2018.
Restriction Requirement regarding U.S. Appl. No. 15/487,175 dated May 16, 2018.
Non-Final Office Action regarding U.S. Appl. No. 15/487,226 dated May 16, 2018.
Applicant-Initiated Interview Summary regarding U.S. Appl. No. 15/487,027 dated Jun. 21, 2018.
Applicant-Initiated Interview Summary regarding U.S. Appl. No. 15/487,101 dated Jun. 21, 2018.
Notice of Allowance regarding U.S. Appl. No. 15/419,394 dated Jul. 20, 2018.
Notice of Allowance regarding U.S. Appl. No. 15/487,201 dated Jul. 20, 2018.
Applicant-Initiated Interview Summary regarding U.S. Appl. No. 15/419,423 dated Aug. 9, 2018.
Notice of Allowance regarding U.S. Appl. No. 15/419,394 dated Aug. 27, 2018.
Corrected Notice of Allowability regarding U.S. Appl. No. 15/419,394 dated Sep. 10, 2018.
Notice of Allowance regarding U.S. Appl. No. 15/419,464 dated Sep. 24, 2018.
Non-Final Office Action regarding U.S. Appl. No. 15/419,349 dated Oct. 18, 2018.
Non-Final Office Action regarding U.S. Appl. No. 15/419,423 dated Oct. 11, 2018.
Notice of Allowance regarding U.S. Appl. No. 15/487,027 dated Oct. 2, 2018.
Notice of Allowance regarding U.S. Appl. No. 15/487,175 dated Oct. 3, 2018.
Final Office Action regarding U.S. Appl. No. 15/487,101 dated Nov. 14, 2018.
Notice of Allowance regarding U.S. Appl. No. 15/487,151 dated Oct. 25, 2018.
Applicant-Initiated Interview Summary regarding U.S. Appl. No. 15/419,423 dated Dec. 12, 2018.
Non-Final Office Action regarding U.S. Appl. No. 15/487,175 dated Jan. 10, 2019.
Applicant-Initiated Interview Summary regarding U.S. Appl. No. 15/487,101 dated Jan. 13, 2019.
Non-Final Office Action regarding U.S. Appl. No. 15/487,226 dated Jan. 7, 2019.
Non-Final Office Action regarding U.S. Appl. No. 15/419,423 dated Jan. 29, 2019.
EPO Communication regarding Rules 161/162 for related PCT Application No. US2017027691 dated Nov. 23, 2018.
Notice of Allowance regarding U.S. Appl. No. 15/419,464 dated Jan. 25, 2019.
Notice of Allowance regarding U.S. Appl. No. 15/487,027 dated Jan. 25, 2019.
Notice of Allowance regarding U.S. Appl. No. 15/419,394 dated Jan. 11, 2019.
Notice of Allowance regarding U.S. Appl. No. 15/487,151 dated Jan. 9, 2019.
Notice of Allowance regarding U.S. Appl. No. 15/487,101 dated Feb. 1, 2019.
Applicant-Initiated Interview Summary regarding U.S. Appl. No. 15/419,423 dated Mar. 28, 2019.

\* cited by examiner

MICROCONTROLLER ARCHITECTURE FOR POWER FACTOR CORRECTION CONVERTER

CROSS-REFERENCE TO RELATED APPLICATIONS

This application is a continuation of U.S. application Ser. No. 15/487,426, filed Apr. 13, 2017 (now U.S. Pat. No. 9,933,842), which (i) is a continuation-in-part of U.S. application Ser. No. 15/419,464, filed Jan. 30, 2017, Ser. No. 15/419,423, filed Jan. 30, 2017, Ser. No. 15/419,394, filed Jan. 30, 2017, Ser. No. 15/487,101, filed Apr. 13, 2017, Ser. No. 15/487,151, filed Apr. 13, 2017, Ser. No. 15/487,175, filed Apr. 13, 2017, Ser. No. 15/487,027, filed Apr. 13, 2017, Ser. No. 15/430,978, filed Feb. 13, 2017, Ser. No. 15/419,349, filed Jan. 30, 2017, Ser. No. 15/487,201, filed Apr. 13, 2017, and Ser. No. 15/487,226, filed Apr. 13, 2017, and (ii) claims the benefit of U.S. Provisional Application Nos. 62/323,607, filed Apr. 15, 2016, 62/323,517, filed Apr. 15, 2016, 62/323,538, filed Apr. 15, 2016, 62/323,527, filed Apr. 15, 2016, 62/323,563, filed Apr. 15, 2016, 62/323,498, filed Apr. 15, 2016, 62/398,641, filed Sep. 23, 2016, 62/323,505, filed Apr. 15, 2016, 62/398,658, filed Sep. 23, 2016, 62/323,532, filed Apr. 15, 2016, 62/323,519, filed Apr. 15, 2016, 62/323,588, filed Apr. 15, 2016, and 62/398,668, filed Sep. 23, 2016. The entire disclosures of the applications referenced above are incorporated by reference.

FIELD

The present disclosure relates to electric motor control systems and methods and more particularly to power factor correction systems and methods.

BACKGROUND

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

SUMMARY

A circuit for driving a motor of a compressor includes a microcontroller, which includes an operational amplifier, a comparator, a first serial interface, and a first dedicated pin. The operational amplifier is configured to amplify a value representative of a current in a power factor correction (PFC) converter. The comparator is configured to compare the amplified value to a reference value and assert a comparison signal in response to the amplified value exceeding the reference value. The comparison signal is output on the first dedicated pin. A programmable logic device includes a second serial interface in communication with the first serial interface and a second dedicated pin. The comparison signal is received on the second dedicated pin and the programmable logic device is configured to receive control messages from the microcontroller via the second serial interface. The programmable logic device is configured to, in response to receiving a first control message from the microcontroller, set a value in an off-time register based on data in the first control message. The programmable logic device is configured to control a power switch of the PFC converter to turn off in response to the comparison signal being asserted. The programmable logic device is configured to, subsequent to controlling the power switch to turn off, wait for a period of time determined by the off-time register and then control the power switch to turn on. The programmable logic device is configured to measure a turn-on delay of the power switch. The programmable logic device is configured to repeat the control, the wait, and the measure.

In other features, the programmable logic device is configured to, in response to receiving a second control message from the microcontroller, transmit the measured turn-on delay to the microcontroller. In other features, the programmable logic device is configured to measure a turn-off delay of the power switch. In other features, the programmable logic device is configured to, in response to receiving a third control message from the microcontroller, transmit the measured turn-off delay to the microcontroller. In other features, the circuit includes a second comparator configured to compare a signal related to a voltage across the power switch to a threshold. The programmable logic device is configured to measure the turn-on delay of the power switch as a delay between controlling the power switch to turn on and receiving an output from the second comparator.

In other features, the programmable logic device is configured to receive a second control message including a plurality of bits and drive the values of the plurality of bits onto a plurality of pins that corresponds one-to-one to the plurality of bits. In other features, the microcontroller is configured to receive new firmware via a serial port connected to the microcontroller via the programmable logic device and write the new firmware to flash memory that is connected to the microcontroller via the programmable logic device.

In other features, the microcontroller is configured to program the programmable logic device using a programming file encoded in a compressed file format. The compressed file format includes serialized instructions that the microcontroller can execute without performing a decompression operation on the programming file. In other features, the programmable logic device includes first and second output pins. The programmable logic device is configured to toggle the first and second output pins to energize an isolated power supply. In other features, the programmable logic device is configured to directly connect flash programming pins of the microcontroller to flash programming pins of an external flash memory chip.

A method of operating a programmable logic device includes incrementing a value in a counter. The method includes comparing the value to a predetermined value. The predetermined value is indicative of a desired off-time of a discrete switching device. The method includes, while the value exceeds the predetermined value, generating a control signal that causes the discrete switching device to be energized. The method includes, in response to an external input, resetting the value in the counter. The external input indicates that a measured current value corresponding to the discrete switching device has exceeded a threshold current value. The method includes updating the predetermined value according to a command received by the programmable logic device.

In other features, the method includes generating a clamp control signal while the control signal is not being generated. The clamp control signal prevents the discrete switching device from being energized. In other features, the method includes halting generation of the clamp control signal while the control signal is being generated.

In other features, the method includes receiving a switch state signal that indicates whether the discrete switching device is energized; in response to a transition in the switch state signal indicating that the discrete switching device has been energized, recording the value of the counter as a turn-on delay; and storing the turn-on delay. In other features, the method includes reporting the turn-on delay to a controller external to the programmable logic device. In other features, the method includes receiving a delay request at the programmable logic device over a serial bus and transmitting the turn-on delay to a source of the delay request over the serial bus.

In other features, the method includes receiving a switch state signal that indicates whether the discrete switching device is energized; comparing the value of the counter to an acceptable turn-on delay; and in response to the value of the counter exceeding the acceptable turn-on delay while the switch state signal indicates that the discrete switching device is not energized, generating a fault signal. In other features, the method includes halting generation of the control signal in response to generation of the fault signal.

In other features, the method includes receiving a switch state signal that indicates whether the discrete switching device is energized; in response to a transition in the switch state signal indicating that the discrete switching device has been de-energized, recording the value of the counter as a turn-off delay; and storing the turn-off delay. A programmable logic device is programmed to implement the above methods.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Refrigeration System

Figure 1:
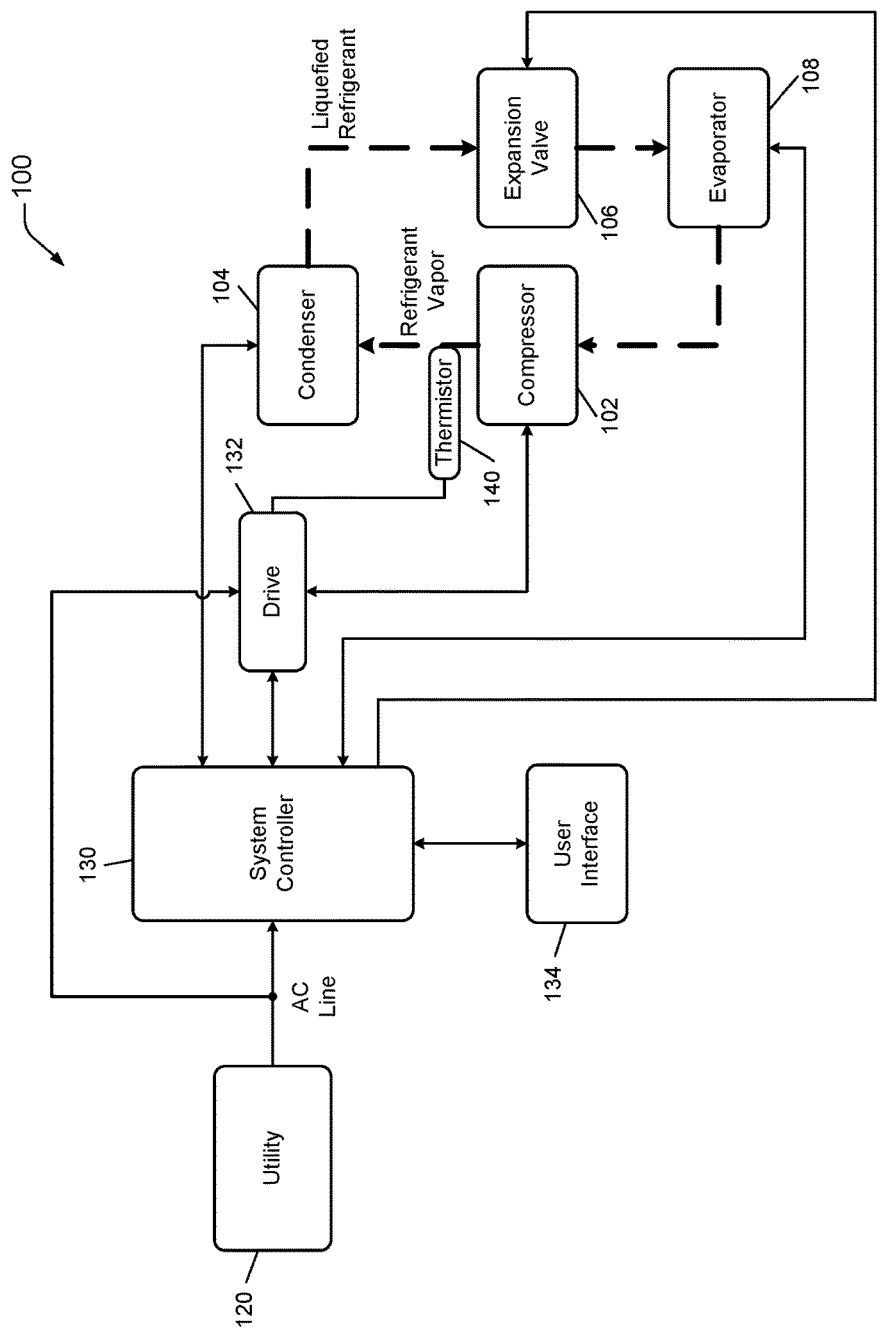
FIG. 1 is a functional block diagram of an example refrigeration system.

FIG. 1 is a functional block diagram of an example refrigeration system 100 including a compressor 102, a condenser 104, an expansion valve 106, and an evaporator 108. According to the principles of the present disclosure, the refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the system controller 130 via an AC line, which includes two or more conductors. The AC power may also be provided to a drive 132 via the AC line. The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the system controller (including, for example, actuating a heat source) may be incorporated into the thermostat.

The system controller 130 may control operation of the fan of the condenser 104, the fan of the evaporator 108, and the expansion valve 106. The drive 132 may control the compressor 102 based on commands from the system controller 130. For example only, the system controller 130 may instruct the drive 132 to operate the motor of the compressor 102 at a certain speed or to operate the compressor 102 at a certain capacity. In various implementations, the drive 132 may also control the condenser fan.

A thermistor 140 is thermally coupled to the refrigerant line exiting the compressor 102 that conveys refrigerant vapor to the condenser 104. The variable resistance of the thermistor 140 therefore varies with the discharge line temperature (DLT) of the compressor 102. As described in more detail, the drive 132 monitors the resistance of the thermistor 140 to determine the temperature of the refrigerant exiting the compressor 102.

The DLT may be used to control the compressor 102, such as by varying capacity of the compressor 102, and may also be used to detect a fault. For example, if the DLT exceeds the threshold, the drive 132 may power down the compressor 102 to prevent damage to the compressor 102.

Drive

Figure 2:
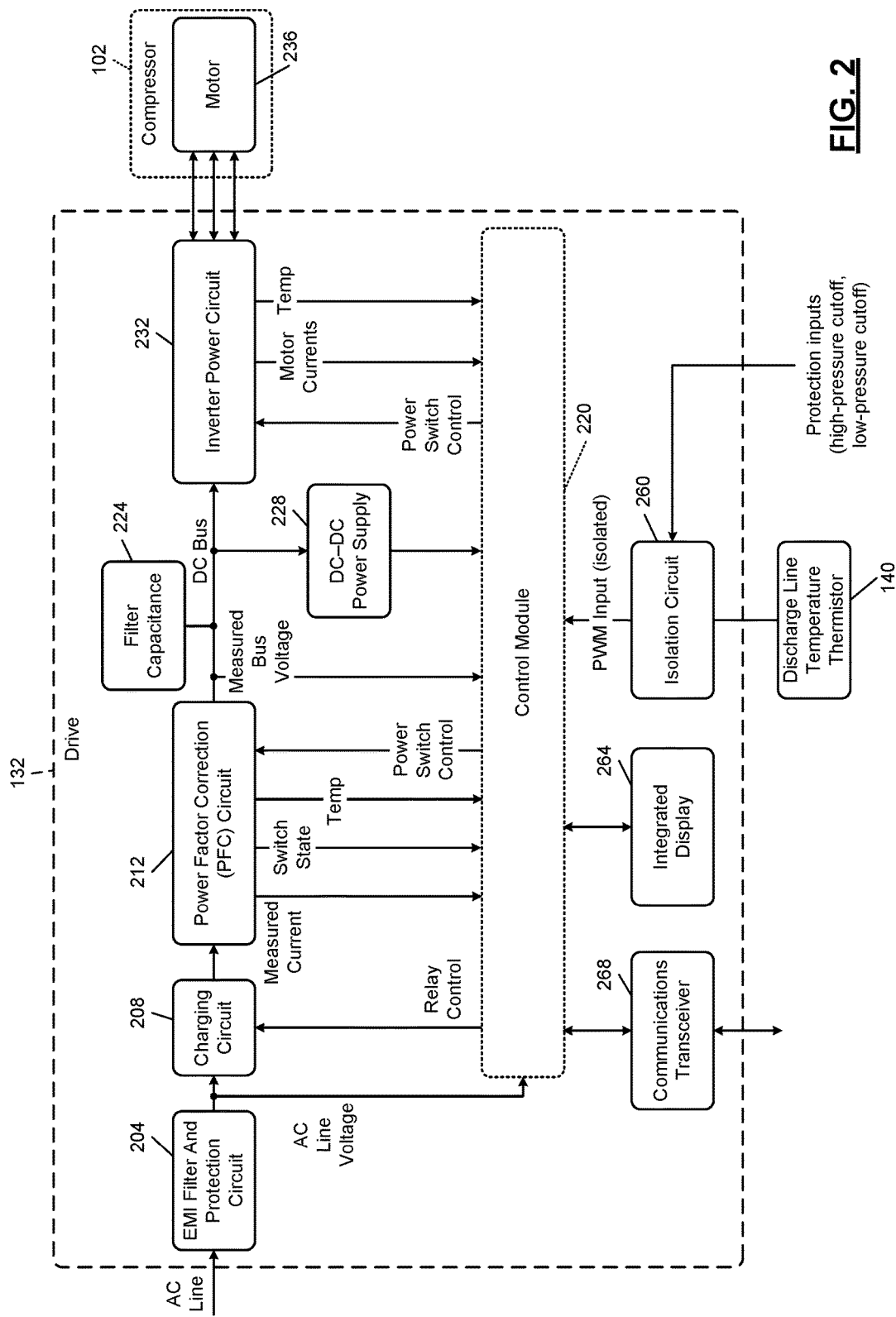
FIG. 2 is a block diagram of an example implementation of the compressor motor drive of FIG. 1.

In FIG. 2, an example implementation of the drive 132 includes an electromagnetic interference (EMI) filter and protection circuit 204, which receives power from an AC line. The EMI filter and protection circuit 204 reduces EMI that might otherwise be injected back onto the AC line from the drive 132. The EMI filter and protection circuit 204 may also remove or reduce EMI arriving from the AC line. Further, the EMI filter and protection circuit 204 protects against power surges and sags, such as a surge caused by lightening.

A charging circuit 208 controls power supplied from the EMI filter and protection circuit 204 to a power factor correction (PFC) circuit 212. For example, when the drive 132 initially powers up, the charging circuit 208 may place a resistance in series between the EMI filter and protection circuit 204 and the PFC circuit 212 to reduce the amount of current inrush. These current or power spikes may cause various components to prematurely fail.

After initial charging is completed, the charging circuit 208 may close a relay that bypasses the current-limiting resistor. For example, a control module 220 may provide a relay control signal to the relay within the charging circuit 208. In various implementations, the control module 220 may assert the relay control signal to bypass the current-limiting resistor after a predetermined period of time following start up, or based on closed loop feedback indicating that charging is near completion.

The PFC circuit 212 converts incoming AC power to DC power. The PFC circuit 212 may not be limited to PFC functionality—for example, the PFC circuit 212 may also perform voltage conversion functions, such as acting as a boost circuit and/or a buck circuit. In some implementations, the PFC circuit 212 may be replaced by a non-PFC voltage converter. The DC power may have voltage ripples, which are reduced by filter capacitance 224. Filter capacitance 224 may include one or more capacitors arranged in parallel and connected to the DC bus. The PFC circuit 212 may attempt to draw current from the AC line in a sinusoidal pattern that matches the sinusoidal pattern of the incoming voltage. As the sinusoids align, the power factor approaches one, which represents the greatest efficiency and the least demanding load on the AC line.

The PFC circuit 212 includes one or more switches that are controlled by the control module 220 using one or more signals labeled as power switch control. The control module 220 determines the power switch control signals based on a measured voltage of the DC bus, measured current in the PFC circuit 212, AC line voltages, temperature or temperatures of the PFC circuit 212, and the measured state of a power switch in the PFC circuit 212. While the example of use of measured values is provided, the control module 220 may determine the power switch control signals based on an estimated voltage of the DC bus, estimated current in the PFC circuit 212, estimated AC line voltages, estimated temperature or temperatures of the PFC circuit 212, and/or the estimated or expected state of a power switch in the PFC circuit 212. In various implementations, the AC line voltages are measured or estimated subsequent to the EMI filter and protection circuit 204 but prior to the charging circuit 208.

The control module 220 is powered by a DC-DC power supply 228, which provides a voltage suitable for logic of the control module 220, such as 3.3 Volts, 2.5 Volts, etc. The DC-DC power supply 228 may also provide DC power for operating switches of the PFC circuit 212 and an inverter power circuit 232. For example only, this voltage may be a higher voltage than for digital logic, with 15 Volts being one example.

The inverter power circuit 232 also receives power switch control signals from the control module 220. In response to the power switch control signals, switches within the inverter power circuit 232 cause current to flow in respective windings of a motor 236 of the compressor 102. The control module 220 may receive a measurement or estimate of motor current for each winding of the motor 236 or each leg of the inverter power circuit 232. The control module 220 may also receive a temperature indication from the inverter power circuit 232.

For example only, the temperature received from the inverter power circuit 232 and the temperature received from the PFC circuit 212 are used only for fault purposes. In other words, once the temperature exceeds a predetermined threshold, a fault is declared and the drive 132 is either powered down or operated at a reduced capacity. For example, the drive 132 may be operated at a reduced capacity and if the temperature does not decrease at a predetermined rate, the drive 132 transitions to a shutdown state.

The control module 220 may also receive an indication of the discharge line temperature from the compressor 102 using the thermistor 140. An isolation circuit 260 may provide a pulse-width-modulated representation of the resistance of the thermistor 140 to the control module 220. The isolation circuit 260 may include galvanic isolation so that there is no electrical connection between the thermistor 140 and the control module 220.

The isolation circuit 260 may further receive protection inputs indicating faults, such as a high-pressure cutoff or a low-pressure cutoff, where pressure refers to refrigerant pressure. If any of the protection inputs indicate a fault and, in some implementations, if any of the protection inputs become disconnected from the isolation circuit 260, the isolation circuit 260 ceases sending the PWM temperature signal to the control module 220. Therefore, the control module 220 may infer that a protection input has been received from an absence of the PWM signal. The control module 220 may, in response, shut down the drive 132.

The control module 220 controls an integrated display 264, which may include a grid of LEDs and/or a single LED package, which may be a tri-color LED. The control module 220 can provide status information, such as firmware versions, as well as error information using the integrated display 264. The control module 220 communicates with external devices, such as the system controller 130 in FIG. 1, using a communications transceiver 268. For example only, the communications transceiver 268 may conform to the RS-485 or RS-232 serial bus standards or to the Controller Area Network (CAN) bus standard.

PFC Circuits

Figure 3A:
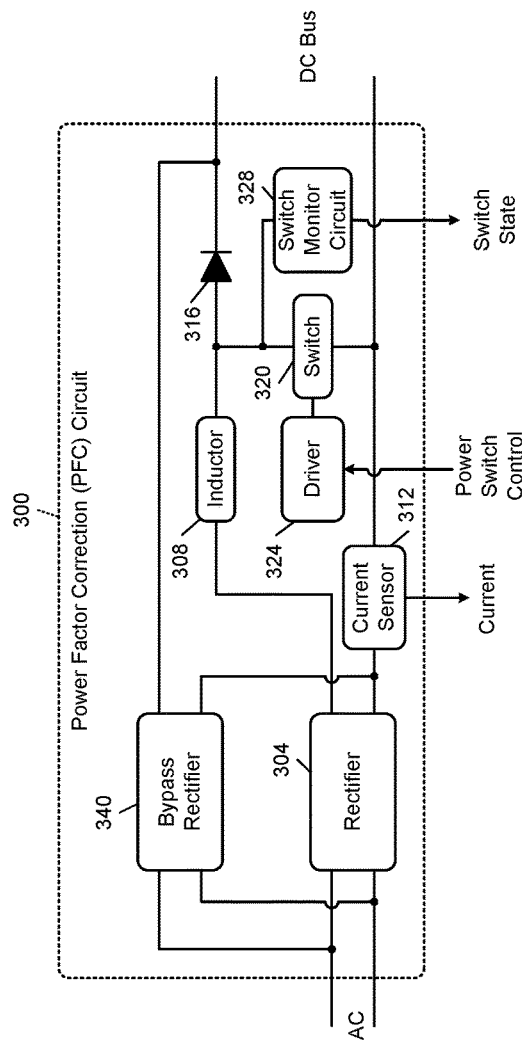
FIG. 3A is a block diagram of an example implementation of the power factor correction circuit of FIG. 2.

In FIG. 3A, a PFC circuit 300 is one implementation of the PFC circuit 212 of FIG. 2. The PFC circuit 300 includes a rectifier 304 that converts incoming AC into pulsating DC. In various implementations, the rectifier 304 includes a full-wave diode bridge. The DC output of the rectifier 304 is across first and second terminals. The first terminal is connected to an inductor 308, while the second terminal is connected to a current sensor 312. An opposite end of the inductor 308 is connected to a node that is common to the inductor 308, an anode of a diode 316, and a first terminal of a switch 320.

The PFC circuit 300 generates a DC bus, where a first terminal of the DC bus is connected to a cathode of the diode 316 while a second terminal of the DC bus is connected to the second output terminal of the rectifier 304 via the current sensor 312. The current sensor 312 can therefore sense the current within the switch 320 as well as the current in the DC bus and current in the inductor 308. The second terminal of the DC bus is also connected to a second terminal of the switch 320.

A driver 324 receives the power switch control signal from the control module 220 of FIG. 2 and rapidly charges or discharges a control terminal of the switch 320. For example, the switch 320 may be a field effect transistor with a gate terminal as the control terminal. More specifically, the switch 320 may be a power metal-oxide-semiconductor field-effect transistor (MOSFET), such as the STW38N65M5 power MOSFET from STMicroelectronics. The driver 324, in response to the power switch control signal, charges or discharges the capacitance at the gate of the field effect transistor.

A switch monitor circuit 328 measures whether the switch is on or off. This closed loop control enables the control module 220 to determine whether the switch 320 has reacted to a command provided by the power switch control signal and may also be used to determine how long it takes the switch 320 to respond to that control signal. The measured switch state is output from the switch monitor circuit 328 back to the control module 220. The control module 220 may update its control of the power switch control signal to compensate for delays in turning on and/or turning off the switch 320.

In FIG. 3A, the inductor, the switch 320, and the diode 316 are arranged in a boost configuration. In brief, the switch 320 closes, causing current through the inductor 308 to increase. Then the switch 320 is opened, but the current through the inductor 308 cannot change instantaneously because the voltage across an inductor is proportional to the derivative of the current. The voltage across the inductor 308 becomes negative, meaning that the end of the inductor 308 connected to the anode of the diode 316 experiences a voltage increase above the voltage output from the rectifier 304.

Once the voltage at the anode of the diode 316 increases above the turn-on voltage of the diode 316, the current through the inductor 308 can be fed through the diode 316 to the DC bus. The current through the inductor 308 decreases and then the switch 320 is closed once more, causing the current and the inductor 308 to increase.

In various implementations, the switch 320 may be turned on until the current sensor 312 determines that a predetermined threshold of current has been exceeded. At that time, the switch 320 is turned off for a specified period of time. This specified period may be adaptive, changing along with the voltage of the DC bus as well as the voltage of the AC input change. However, the off time (when the switch 320 is open) is a specified value. Once a time equal to the specified value has elapsed, the switch 320 is turned back on again and the process repeats. The off time can be fixed or variable. In the case of the off time being variable, the off time can be limited to at least a predetermined minimum off time.

To reduce the physical size and parts cost of the PFC circuit 300, the inductance of the inductor 308 (which may be the largest contributor to the physical size of the PFC circuit 300) may be lowered. However, with a lower inductance, the inductor 308 will saturate more quickly. Therefore, the switch 320 will have to operate more quickly. While more quickly and smaller are relative terms, present power switching control operates in the range of 10 kilohertz to 20 kilohertz switching frequencies. In the present application, the switching frequency of the switch 320 may be increased to more than 50 kilohertz, more than 100 kilohertz, or more than 200 kilohertz. For example, the switching frequency of the switch may be controlled to be approximately 200 kilohertz.

The switch 320 is therefore chosen to allow for faster switching as well as to have low switching losses. With faster switching, the inductance of the inductor 308 can be smaller. In addition, the diode 316 may need to be faster. Silicon carbide diodes may have fast response times. For example, the diode 316 may be an STPSC2006CW Silicon Carbide dual diode package from STMicroelectronics.

In order to accurately drive the switch 320 when operating at higher speeds, the control strategy must similarly be accelerated. For example only, the control module 220 may include multiple devices, such as a microcontroller configured to perform more involved calculations and an FPGA (field programmable gate array) or PLD (programmable logic device) configured to monitor and respond to inputs in near real time. In this context, near real time means that the time resolution of measurement and time delay in responding to inputs of the FPGA or PLD is negligible compared to the physical time scale of interest. For faster switching speeds, the near real time response of the FPGA/PLD may introduce non-negligible delays. In such cases, the delay of the FPGA/PLD and driving circuitry may be measured and compensated for. For example, if the turn-off of a switch occurs later than needed because of a delay, the turn-off can be instructed earlier to compensate for the delay.

A bypass rectifier 340 is connected in parallel with the rectifier 304 at the AC line input. A second output terminal of the bypass rectifier 340 is connected to the second terminal rectifier 304. However, a first output terminal of the bypass rectifier 340 is connected to the cathode of the diode 316.

As a result, when the PFC circuit 300 is not operating to boost the DC bus voltage, the bypass rectifier 340 will be active when the line-to-line voltage of the AC input exceeds the voltage across the DC bus. The bypass rectifier 340, in these situations, diverts current from passing through the diode 316. Because the inductor 308 is small, and the switch 320 switches rapidly, the diode 316 is also selected to exhibit fast switching times. The diode 316 may therefore be less tolerant to high currents, and so current is selectively shunted around the diode 316 by the bypass rectifier 340.

In addition, the current path through the rectifier 304 and the diode 316 experiences three diode voltage drops, while the path through the bypass rectifier 340 experiences only two diode voltage drops. While the single phase AC input in FIG. 3A is associated with a boost converter topology, the present disclosure also encompasses a buck converter topology or a buck-boost converter topology.

Figure 3B:
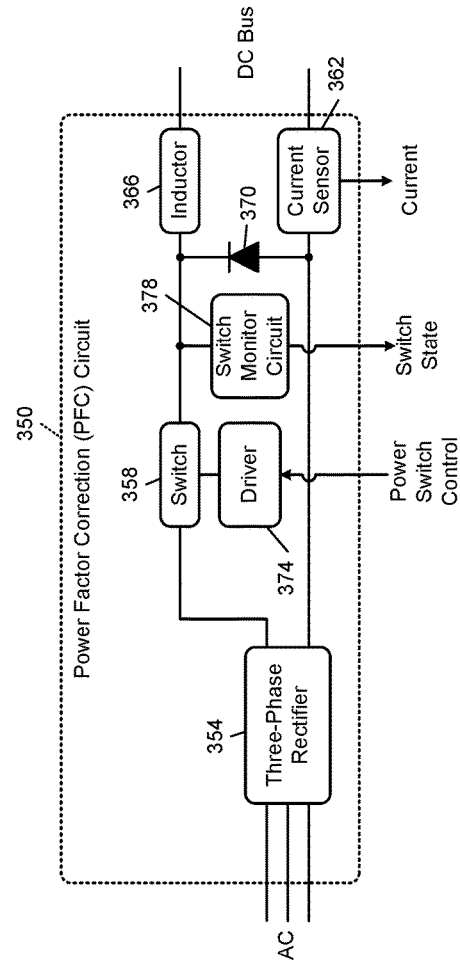
FIG. 3B is a block diagram of another example implementation of the power factor correction circuit of FIG. 2.

In FIG. 3B, a buck converter topology is shown with a three-phase AC input signal. Note that the principles of the present disclosure also apply to a boost converter or buck-boost converter topology used with a three-phase AC input. A PFC circuit 350 represents another implementation of the PFC circuit 212 of FIG. 2.

A three-phase rectifier 354 receives three-phase AC and generates pulsating DC across first and second terminals. A switch 358 is connected between the first terminal of the three-phase rectifier 354 and a common node. The common node is connected to an inductor 366 and a cathode of a power diode 370.

An anode of the power diode 370 is connected to a second terminal of the three-phase rectifier 354. An opposite terminal of the inductor 366 establishes one terminal of the DC bus, while the second output of the three-phase rectifier 354 establishes the other terminal of the DC bus. In the configuration shown in FIG. 3B, the switch 358, the inductor 366, and the power diode 370 are configured in a buck topology.

A current sensor 362 is connected in series between the anode of the power diode 370 and the DC bus. In other implementations, the current sensor 362 may be located in series with the inductor 366. In other implementations, the current sensor 362 may be located in series with the switch 358. In other implementations, the current sensor 362 may be located in series between the anode of the power diode 370 and the second output of the three-phase rectifier 354. The current sensor 362 measures current through the inductor 366 as well as current through the DC bus and provides a current signal indicative of the amount of the current.

A driver 374 drives a control terminal of the switch 358 based on a power switch control signal from the control module 220 in FIG. 2. A switch monitor circuit 378 detects whether the switch 358 has opened or closed and reports the switch state to the control module 220. With the location of the current sensor 362, the current sensor 362 will measure approximately zero current when the switch 358 is open.

Functional Blocks

Figure 4:
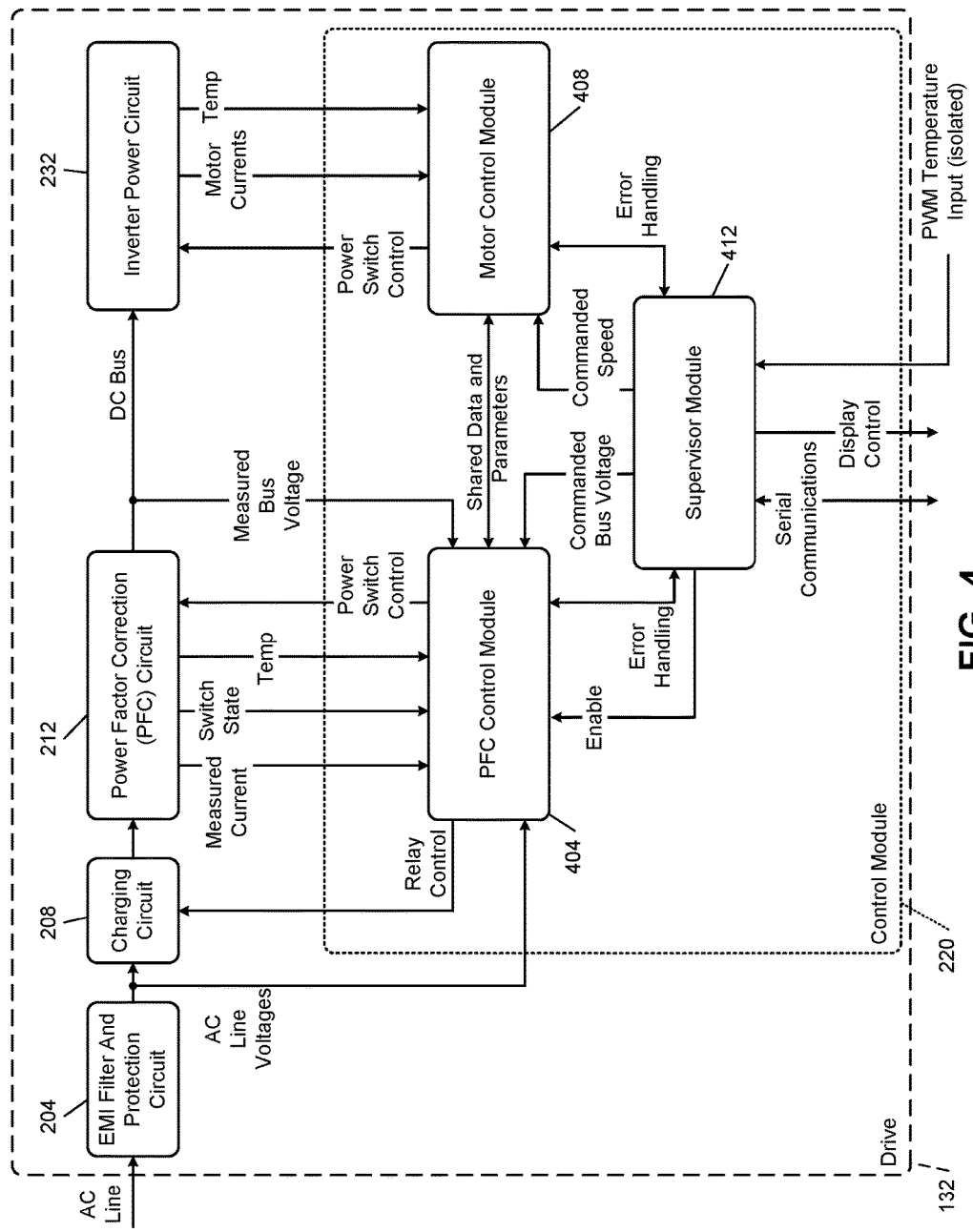
FIG. 4 is a functional block diagram of an example implementation of the control module of FIG. 2.

In FIG. 4, functional blocks of the control module 220 are presented. A PFC control module 404 is responsible for the power switch control signals sent to the PFC circuit 212, while a motor control module 408 is responsible for the power switch control signals sent to the inverter power circuit 232. The PFC control module 404 and the motor control module 408 may share data and parameters between each other. For example, this may communication may be as simple as one module calling a routine of the other or maintaining a shared variable between the two modules.

The PFC control module 404 may be enabled by a supervisor module 412 and will attempt to control the measured bus voltage to be equal to a commanded bus voltage from the supervisor bus module. The supervisor module 412 may also control the motor control module 408 to cause the inverter power circuit 232 to drive the motor 236 (shown in FIG. 2) at a commanded speed.

The supervisor module 412 may cooperate in error handling with the PFC control module 404 and the motor control module 408. For example, when one of the PFC control module 404 or the motor control module 408 detects a fault, the supervisor module 412 may instruct the other to either reduce capacity or power down all together. The supervisor module 412 communicates using serial communications with, for example, the system controller 130 of FIG. 1. The supervisor module 412 may also be responsible for controlling the display, such as to display firmware versions, operating parameters, and present or historical faults.

The supervisor module 412 may also receive a pulse-width-modulated temperature input. In response to the discharge line temperature of the compressor 102 increasing above a threshold, the supervisor module 412 may shut down the drive 132. The temperature input may also convey information about other faults. For example, if the temperature input disappears, a fault may be inferred, and the supervisor module 412 will shut down the drive 132. The functions associated with the supervisor module 412 may be partially or fully distributed to other modules, such as by being shared between the PFC control module 404 and the motor control module 408.

In some implementations, fan control also may require another motor control module similar to the motor control module 408 and another inverter power circuit similar to the inverter power circuit 232.

Devices

Figure 5:
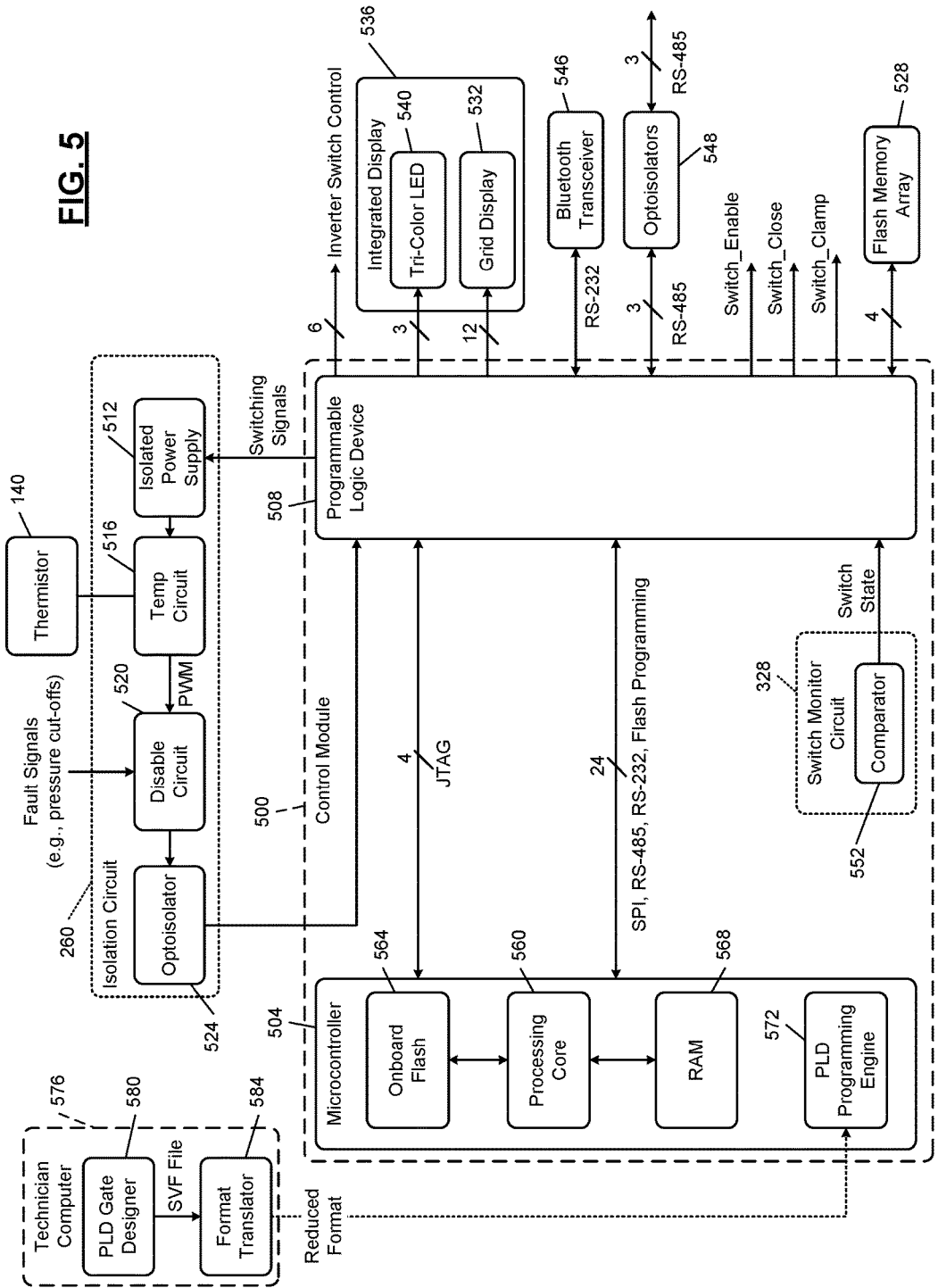
FIG. 5 is a block diagram of an example implementation of the control module of FIG. 2.

In FIG. 5, a schematic representation of an implementation of the control module 220 of FIG. 4 is shown at 500. The control module 500 includes a microcontroller 504 and a PLD (programmable logic device) 508, which may be considered a CPLD (complex programmable logic device). At a high level, in order to reduce the overall cost of the control module 500, the microcontroller 504 handles certain tasks to which it is suited and the PLD 508 handles other tasks to which the PLD 508 is suited.

Depending on the architecture of the control module 500, various tasks could be reapportioned between the microcontroller 504 and the PLD 508. In fact, with a faster or more capable microcontroller, the microcontroller 504 could subsume the tasks of the PLD 508. The reverse may also be true: with a more capable PLD or FPGA (Field Programmable Gate Array), the PLD 508 could subsume the tasks of the microcontroller 504.

In the architecture shown in FIG. 5, the PLD 508 may perform low-latency measurements and low-latency control actions. For example, the PLD 508 may measure a delay between when a switch is turned on and when the voltage across the switch reflects that the switch has turned on. Without paying extra for speed, the microcontroller 504 may not be able to measure these delays with sufficient resolution.

The isolation circuit 260, mentioned above, includes an isolated power supply 512, a temperature circuit 516 that converts a resistance of the thermistor 140 into a PWM (pulse-width modulation) signal, a disable circuit 520, and an optoisolator 524. The optoisolator 524 creates galvanic isolation between the 260 and the PLD 508. The PLD 508 is used to provide continuous switching signals to energize the isolated power supply 512, as will be discussed in more detail below. Within the isolated power supply 512, there is another galvanic isolator (which may be a transformer). The PLD 508 receives the PWM signal and may be programmed to stop the drive 132 if the PWM signal from the optoisolator 524 stops oscillating.

Meanwhile, the microcontroller 504 is used for calculations, such as to determine a desired off-time for a switch in a PFC. The microcontroller 504 may also be better suited for calculations involved in generating a reference sinusoid that tracks the incoming AC line in frequency and phase. Further, the microcontroller 504 may be used for performing mathematical control routines involving filtering.

The microcontroller 504 may include routines for flashing new data into a flash memory array 528 and may include routines for programming the PLD 508. In addition, the microcontroller 504 may include one or more networking stacks to perform serial networking, such as using RS-232 or RS-485.

The PLD 508 may also be used as a PIN expansion device for the microcontroller 504. For example, the microcontroller 504 may communicate with the PLD 508 using a serial port (such as a 4-pin SPI port, or serial peripheral interface). The microcontroller 504 can transmit a command over the serial port and the PLD 508 can use multiple pins to enact that command. As one example described above, the PLD 508 may receive 12 bits of data via a serial port and then assert or de-assert, as each bit dictates, 12 pins connected to a grid display 532. The PLD 508 may maintain those 12 pins until the next command is received from the microcontroller. Although the term pins is used, the term is not limited to physical pins, but applies to other mounting technologies, such as the balls of a ball grid array package.

An integrated display 536 includes the grid display 532 and may be mounted on a printed circuit board (PCB) along with the microcontroller 504 and the PLD 508. The integrated display 536 may further include a tri-color LED 540, which can generate a range of colors based on variable currents supplied to red, green, blue LEDs within the tri-color LED 540.

For example only, the commands from the microcontroller 504 may be divided into read and write commands. In various implementations, each command may be 16 bits long and the first bit may define whether the command is to read or to write. The next 3 bits may define the address from where data will be read/written. As one example, a first 3-bit address may correspond to the grid display 532. The remaining 12 bits of the command are the data to be written to the grid display 532. As mentioned, the 12 bits map directly to output pins that drive the grid display 532. For the first 3-bit address, a write command may be the only relevant command. The commands may include an error detection mechanism, such as a cyclic redundancy check (CRC) code. The receiver may drop messages when the received CRC code does not match the CRC code calculated from the received message.

If the PLD 508 has sufficient available memory, available logic, and available pins, the PLD 508 is well-suited to iteratively scanning through the LEDs of the grid display 532. After receiving a pattern to display on the grid display 532, the PLD 508 can continue to scan through the LEDs of the grid display 532 to maintain the illumination of that pattern until a replacement pattern is received.

However, if resources of the PLD 508 are dedicated to other functions, such as operating a fan motor (such as a condenser fan motor), display tasks may be reassigned to the microcontroller 504. Another option is to select a PLD as the PLD 508 that has additional capabilities; however, this may increase the bill of materials of the control module 500. Meanwhile, accommodating functionality (such as driving the grid display 532) in the microcontroller 504 may be possible with the available resources of the microcontroller 504. In other implementations, increasing the capability of the microcontroller 504 to accommodate certain functionality may be less costly in terms of the bill of materials than increasing the capability of the PLD 508. This may be especially true when there is coarser granularity in the device choices.

In various implementations, the microcontroller 504 connects directly to both the grid display 532 and the tri-color LED 540 of the integrated display 536. The microcontroller 504 may have sufficient memory and input/output capability to perform real-time control of two inverters (for example, to control both a compressor motor and a condenser fan), but not have sufficient processing throughput. For applications where dual-inverter control is or may be needed, a more capable part, with greater processing throughput, may be chosen as the microcontroller 504.

As another example of 3-bit addresses, a second 3-bit address may correspond to a minimum off-time for driving a PFC switch. For the second 3-bit address, a write command may be the only relevant command. However, in other implementations, the addresses may be multiplexed, in that writing to the first 3-bit address involves a different logic unit that reading from the first 3-bit address. For example, writing to the first 3-bit address (011, as an example) may write to the display section, while reading from the first 3-bit address (011) may retrieve the measured turn-on delay for the PFC switch.

The PLD 508 may be configurable such that any one pin can be connected to any other pin. Therefore, by connecting many pins of the microcontroller 504 to the PLD 508, the PLD 508 can act as a massive multiplexer, increasing the flexibility for changing the roles of pins of the microcontroller 504 without requiring a new board layout.

The microcontroller 504 may connect to the PLD 508 using a 4-pin JTAG (Joint Test Action Group) port by which the microcontroller 504 can program the PLD 508. In one particular implementation, the microcontroller 504 may further have another 24 pins connected to the PLD 508. Some of the 24 pins are reserved for the SPI interface, the RS-485 interface, RS-232 interface, and for flash programming.

In various implementations the PLD 508 may pass through RS-232 signals, such as to a Bluetooth transceiver 546 that can interface with a mobile computing device, which may be able to observe status of the control module 500 and reprogram the control module 500. The RS-485 port may include optosiolators 548, which galvanically isolate the RS-485 serial port.

The PLD 508 may pass through the signals from 4 pins of the microcontroller 504 to the flash memory array 528 to allow for flash programming. In various implementations, such as a layout where two inverters can be controlled, three pins may be connected to both the PLD 508 and the flash memory array 528, while a fourth pin (such as chip select) is connected directly between the microcontroller 504 and the flash memory array 528. For example, the three pins may be SCLK, MSO (or, MISO), and MSI (or, MOSI) of an SPI interface.

The PLD 508 may also pass through inverter switch control signals from the microcontroller 504. For example, the inverter power circuit 232 of FIG. 2 may include two switches for each of the three windings of the motor, meaning that six inverter switch signals may be received from the microcontroller 504 and passed through directly to the inverter power circuit 232 by the PLD 508.

In various implementations, such as a layout where two inverters can be controlled, the 6 inverter switch control pins may be connected directly from the microcontroller 504 to the compressor inverter, while another 6 inverter switch control pins may be connected directly from the microcontroller 504 to an inverter that drives a condenser fan motor. In such implementations, timers of the microcontroller 504 may be used to generate the inverter switch control signals. In various implementations, the timers may monitor external pins or internal control signals that signal a hard shutdown for the timer. For example, a hard shutdown may be used in an overcurrent situation to prevent further switching of, and deactivate, the inverter power switches.

The PLD 508 may receive an indication of switch state from the switch monitor circuit 328, where the switch of interest is the PFC power switch. The PLD 508 may be instructed, as described in more detail below, to control the PFC switch with a certain off-time. The PLD 508 may therefore selectively enable the switch using a switch_enable signal, may selectively close the switch with a switch_close signal and may clamp a control terminal of the switch to maintaining the switch in an off (or open) position using a switch_clamp signal.

As one specific example of the PLD 508, an Altera EPM570T100I5, having 570 logic elements, may be used. As another example, the EPM240T100I5, having 240 logic elements, may instead be used. The device with fewer logic elements is less expensive. For example, the greater number of logic gates is helpful for development, but the additional logic elements may no longer be necessary for production systems once development is complete. Therefore, production systems may employ a less-expensive part.

A specific example of the microcontroller 504 is the ST microelectronics STM32F303RBT6. In FIG. 5, the microcontroller 504 is shown for simplicity with only a processing core 560, on-board flash 564, and RAM (Random Access Memory) 568. A PLD programming engine 572, while shown separately, may be stored in the on-board flash 564 and loaded into RAM 568 to program the PLD 508.

The PLD programming engine 572 is invoked by a technician operating from a technician computer 576. A programmable logic developer prepares a new logic design for the PLD 508 using a PLD gate designer 580. The PLD gate designer 580 produces an SVF (serial vector format) file. The SVF file is human-readable and not designed to be space-efficient.

A format translator 584 applies a transformation to the SVF file according to the principles of the present disclosure to arrive at a reduced format. The reduced format of the logic design is provided to the PLD programming engine 572. The technician computer 576 may access the microcontroller 504 via the Bluetooth bridge 544, which passes serial commands through the PLD 508 to the microcontroller 504. For this reason the line from the format translator 584 to the PLD programming engine 572 is shown dotted, as the actual path taken by the reduced format file may not be as direct. As described in more detail below, the PLD programming engine 572 is able to directly execute instructions from the reduced format file to reprogram the PLD 508.

Analog

Figure 6:
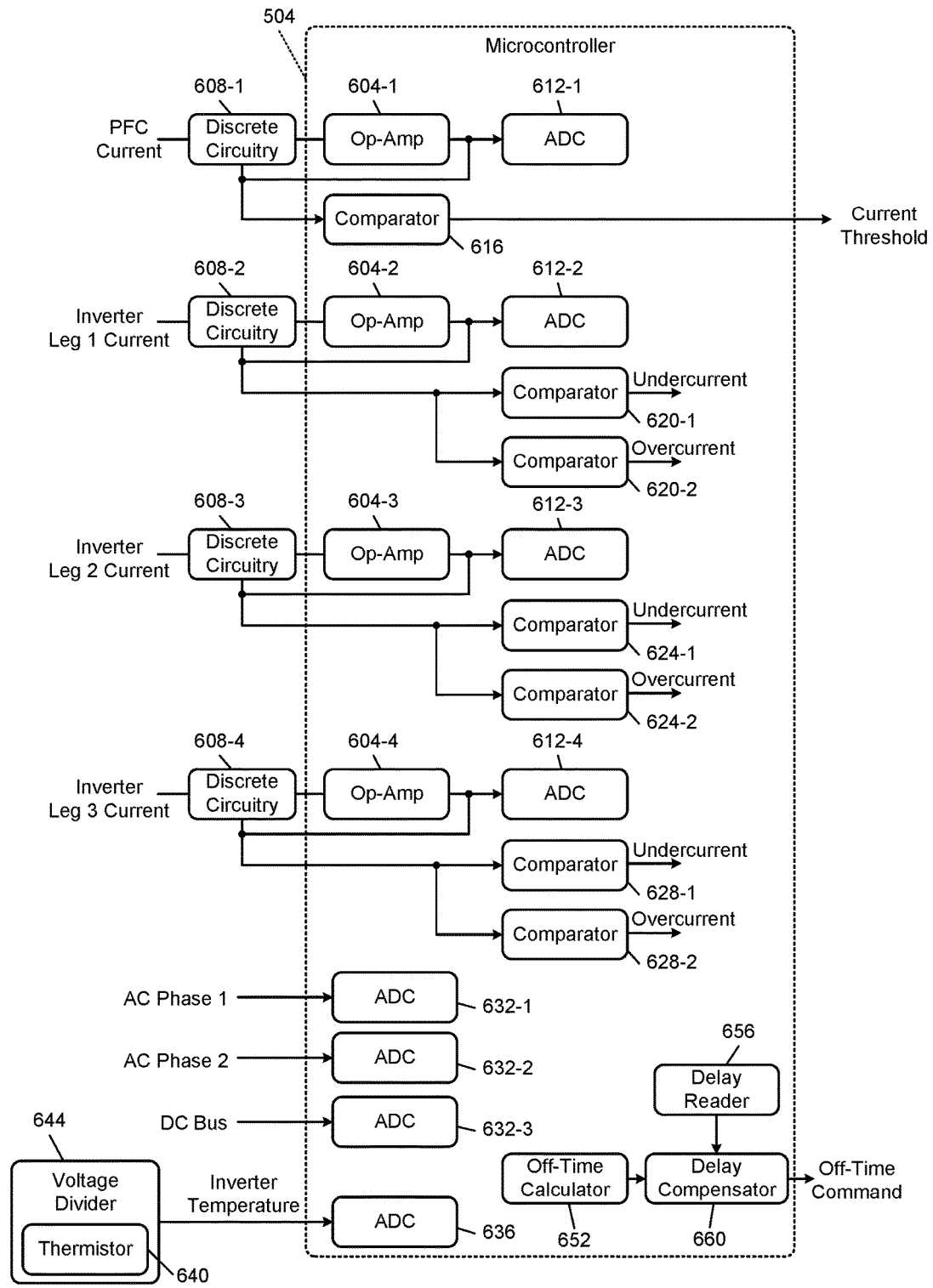
FIG. 6 is a block diagram of selected portions of an example implementation of the microcontroller of FIG. 5.

In FIG. 6, an example implementation of a microcontroller 504 is shown with analog circuitry implemented in the microcontroller 504. By selecting an appropriate microcontroller 504, much of the analog circuitry is provided and does not impose the costs and board space of discrete components. The principles of the present disclosure apply to innumerable other configurations, such as for implementations with microcontrollers that include less analog circuitry, but may have multiplexers to allow a limited set of analog circuitry to handle more inputs. The present disclosure also applies to implementations with microcontrollers that have no analog circuitry. In other implementations, the microcontroller may have analog circuitry that is not used, which may allow for future designs or may simply be integrated with the chosen microcontroller. In some implementations, analog circuitry on the microcontroller may be ignored in favor of external circuitry that may have a preferable metric, such as bandwidth, power consumption, or accuracy.

In the particular implementation shown in FIG. 6, the microcontroller 504 includes op-amps 604-1, 604-2, 604-3, and 604-4 (operational amplifiers). The op-amps 604 are connected with discrete circuitry 608-1, 608-2, 608-3, and 608-4, respectively. The discrete circuitry 608 conditions, filters, and provides feedback paths for the op-amps 604.

The op-amps 604 are used to measure the PFC current, current in leg one of the inverter, current in leg two of the inverter, and current in leg three of the inverter, respectively. The outputs of the op-amps 604 are respectively connected to analog-to-digital converters 612-1, 612-2, 612-3, and 612-4. The microcontroller 504 then has digital representations of these four values.

In addition, for faster reaction times, a comparator 616 receives the output of the op-amp 604-1 and outputs a current threshold signal. In other words, once the PFC current exceeds a threshold, the comparator 616 will set the current threshold signal to be active.

For each inverter leg current, a pair of comparators is provided. For the leg one current, a comparator 620-1 determines whether an undercurrent condition is present while a comparator 620-2 determines whether an overcurrent condition is present. In various implementations, these may be fault conditions, in other implementations, these may be control mechanisms to determine when to reverse the control line of a switch.

Undercurrent and overcurrent for the second inverter leg are similarly measured by comparators 624-1 and 624-2. Finally, the undercurrent and overcurrent for leg three of the inverter are measured by the comparators 628-1 and 628-2 respectively. ADCs 632-1, 632-2, and 632-3 supply the microcontroller 504 with digital values of the incoming AC line voltages and the DC bus. An ADC 636 receives an inverter temperature signal from a voltage divider 640 including a temperature-sensitive thermistor 644.

Although the comparators 616, 620, 624, and 628 are shown in this example as connecting to the discrete circuitry 608, respectively, external to the microcontroller 504, comparators, op-amps, and ADCs may be connected to each other in a variety of manners depending on the controller. In fact, even for a given controller part selection, the interconnections may depend on how other portions of the microcontroller are configured, based on available pins and the internal microarchitecture of the controller.

In various implementations, a part selected as the microcontroller 504 may have sufficient processing throughput to allow control of two inverters, but does not include certain analog components. For example, the selected part may include ADCs but not op-amps or comparators. In such implementations, external op-amps may be implemented to provide signals to ADCs on-board the microcontroller, while comparator outputs (overcurrent and/or undercurrent trips) may be fed directly to the PLD.

While FIG. 6 is primarily focused on analog circuitry, off-time determination is shown to provide context for later explanation of the action of the PLD in enacting the off-time command. An off-time calculation 652 calculates a desired off-time for the switch in a PFC circuit. For example, the off-time may be based on the voltage of the incoming AC waveform, the voltage of the DC bus, and the desired switching frequency.

A delay reader 656 receives information about switching delays from the PLD 508. For example, the delay reader 656 may receive a turn-on delay value and a turn-off delay value. A delay compensator 660 adjusts the off-time calculated by the off-time calculator 652 based on these delays. For example only, if the turn-on and turn-off delays are identical, they may offset each other and require no compensation. Therefore, the delay compensator 660 may compensate for the difference between the turn-on and turn-off delays. The compensated off-time command is outputted to the PLD 508.

Figure 7A:
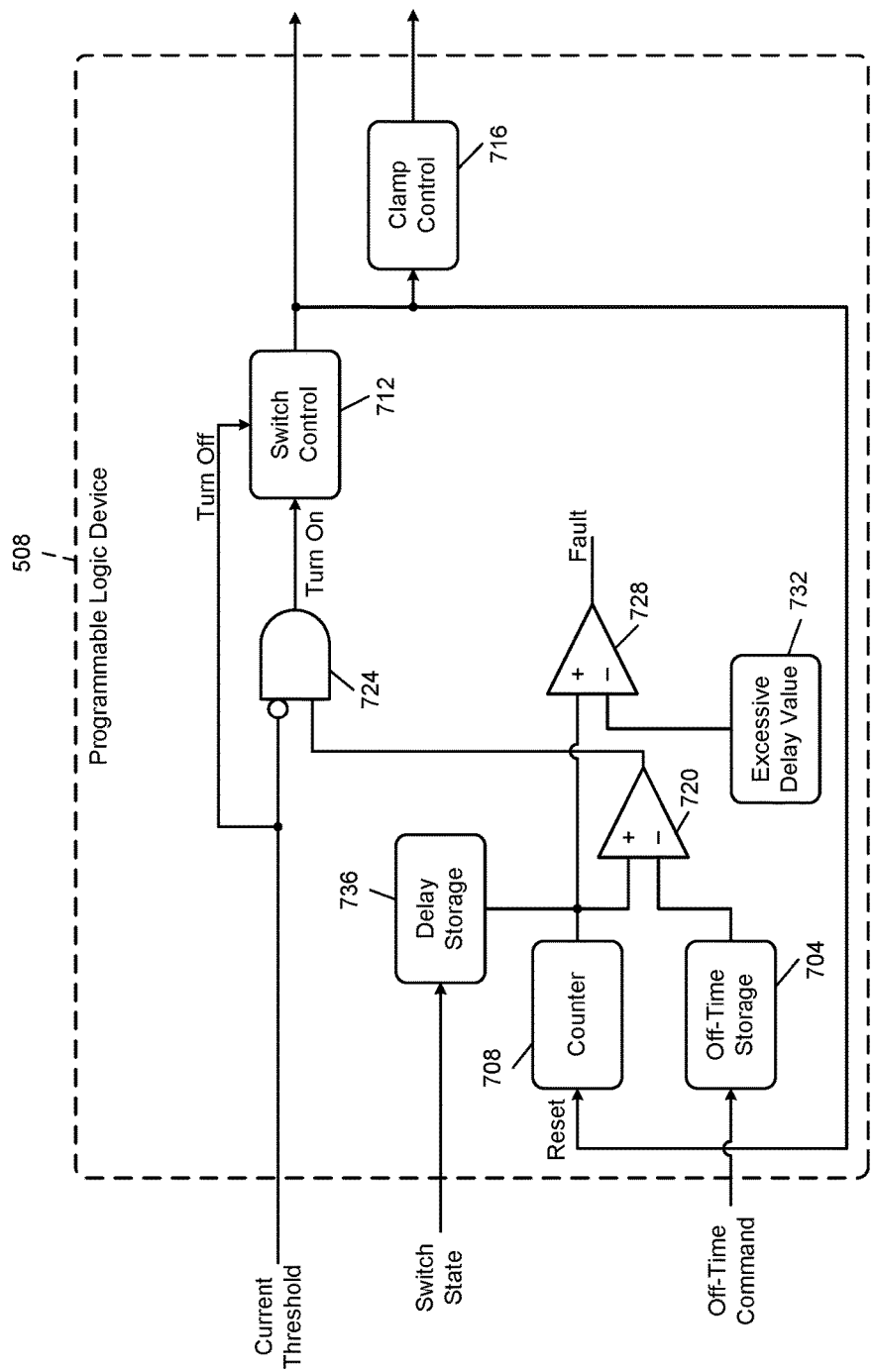
FIGS. 7A and 7B are functional block diagrams of selected portions of example implementations of the programmable logic device of FIG. 5.

In FIG. 7A, the switch-controlling aspects of one implementation of the PLD 508 are shown. Off-time storage 704 receives the off-time command from the microcontroller 504. A counter 708 tracks the amount of time since the control of the switch has reversed. Specifically switch control 712 outputs a signal to close or open the switch. Meanwhile, clamp control 716 controls the clamping circuit in opposition to the switch control 712. In other words, while the switch control 712 is attempting to close the switch, the clamp control 716 removes the clamping from the control terminal of the switch.

The current threshold signal from the microcontroller 504 (generated by a comparator in the microcontroller 504 according to the amplified PFC current measurement) is used to provide a turn-off signal to the switch control 712. In other words, when the current threshold signal is asserted, this acts as a turn-off signal to the switch control 712.

At the time the switch control 712 turns off, the counter 708 resets and a digital comparator 720 begins comparing the incrementing counter to the off-time storage 704. Once the counter 708 exceeds the off-time storage 704, the comparator 720 activates a signal going to an AND gate 724. The AND gate outputs a turn-on signal to the switch control 712 once the comparator 720 asserts its output and the current threshold signal is de-asserted. This prevents the switch from being turned on before the current threshold has been crossed in the downward direction.

Meanwhile, another comparator 728 monitors the value of the counter 708 with respect to an excessive delay value 732. In response to the counter 708 exceeding the excessive delay value 732, a fault is declared. This may occur if the counter 708 continues to increase but, because the current threshold signal reverses, the counter 708 is never reset.

A switch state signal is received by delay storage 736. The delay storage 736 saves the value of the counter 708 when the switch state signal transitions. In other words, once the switch control signal 712 instructs the switch to turn on, the counter 708 resets and, after a period of time, the switch state indicates that turn-on of the switch has been observed. The delay storage 736 latches the value of the counter 708 at this time, which is a measurement of turn-on delay. The delay storage 736 may maintain a separate delay number for turn-off delay.

Figure 7B:
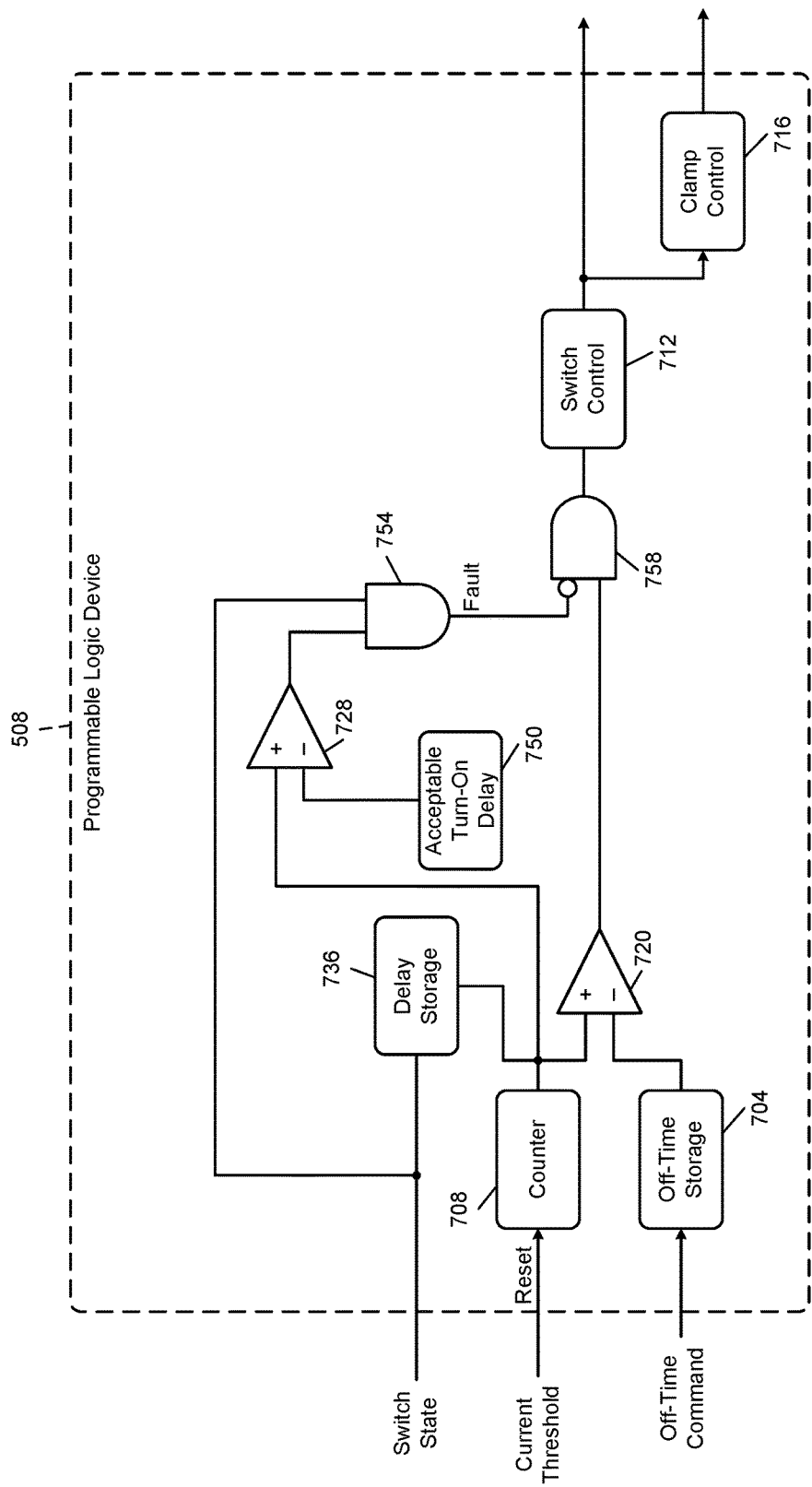

In FIG. 7B, another implementation of switch-controlling logic in the PLD 508 is shown. Certain components having the same reference numerals as FIG. 7A may operate similarly, but are connected differently. In FIG. 7B, when the value of the counter 708 exceeds the off-time value stored in the off-time storage 704, the comparator 720 enables the switch control 712 to drive the power transistor. The counter 708 is reset to zero, thereby disabling the switch control 712, when the current threshold signal is received, which indicates that a predetermined current is exceeded through the power transistor.

In various implementations, the current threshold signal acts as a momentary reset, resetting the counter 708 to zero at the moment the current threshold signal is asserted, but then allowing the counter 708 to begin incrementing. In other implementations, the current threshold signal maintains the counter 708 in a reset state until de-asserted (by the measured current falling below the same current threshold, or if hysteresis is implemented, a lower current threshold).

The switch state signal arrives from the switch monitor circuit 328, which in some implementations is also referred to as a DSAT circuit. The switch state signal may be active-high or active-low, but in this example description will correspond to the value of the voltage measured by the switch monitor circuit 328. Once the power switch is turned on, the voltage measured by the switch monitor circuit 328 is expected to reach a low voltage (below a predetermined threshold) relatively quickly (after a predetermined delay). The low voltage will be indicated by the switch state signal transitioning from, in this example, high to low.

The maximum acceptable turn-on delay for the power switch may be stored in a register 750. If the value of the counter 708 exceeds the acceptable turn-on delay, the output of the comparator 728 goes high. An AND gate 754 outputs a high signal, indicating a fault, if the acceptable turn-on delay is exceeded and the switch state indicates that the measured voltage has not yet fallen to a low level as expected. The fault signal, in some implementations, may be fed to an inverting input of an AND gate 758. In other words, when asserted, the fault signal causes the output of the AND gate 758 to go low, disabling the switch control 712.

The delay storage 736 latches the value of the counter 708 when the switch state signal transitions from high to low. This value from the delay storage 736 can then be read by the microcontroller 504 to adjust the off or on times based on how long it takes the switch to operate following a change in control input.

Programming Control

Figure 8A:
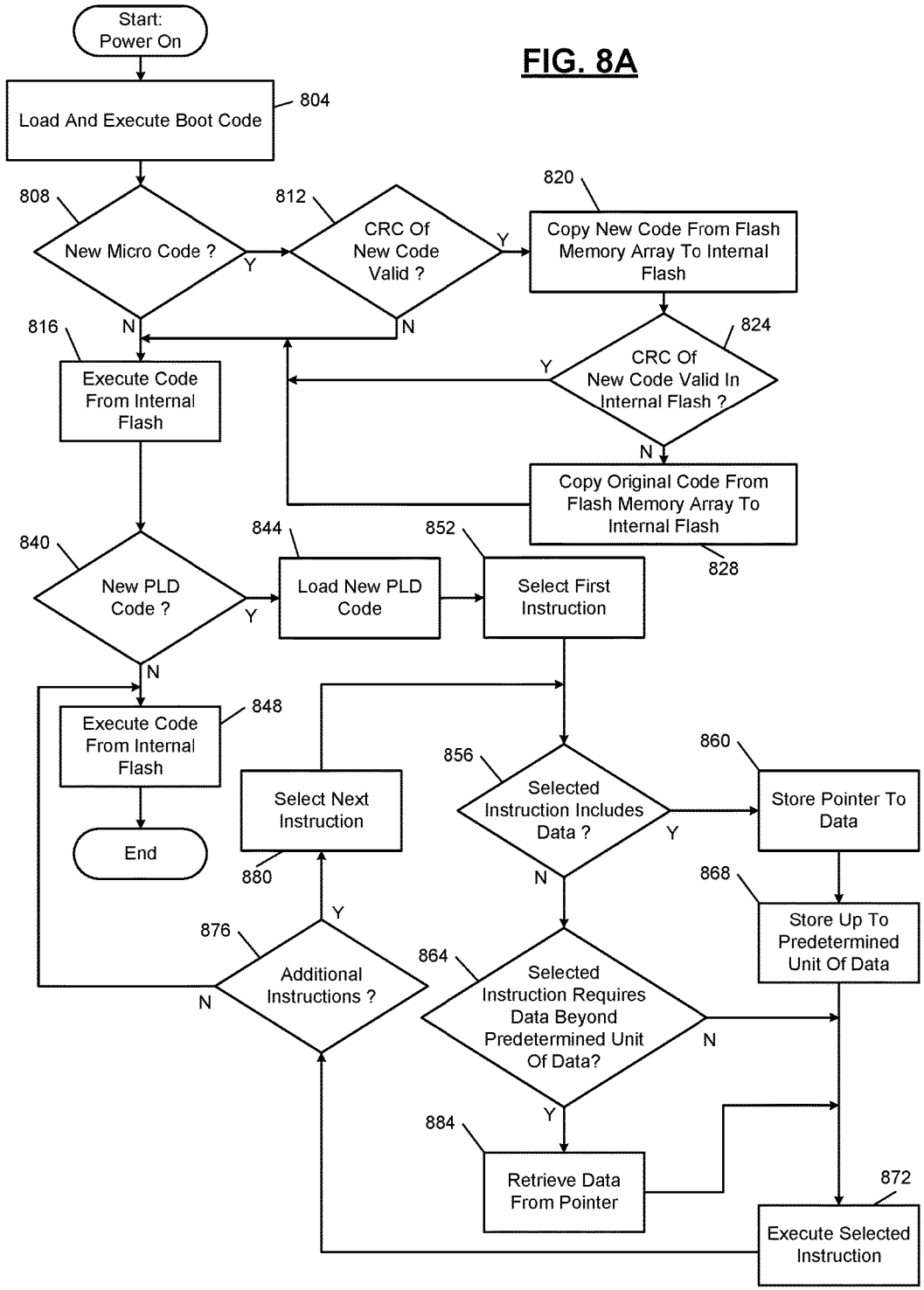
FIGS. 8A and 8B are flowcharts of example firmware updating operation for the microcontroller and programmable logic device.

In FIG. 8A, control begins at 804 upon power-on of the microcontroller. The microcontroller loads boot code from internal flash into RAM and executes the boot code. In other implementations, the boot code may be stored in off-chip storage. Control executes the boot code and continues at 808.

At 808, control determines whether new microcontroller code is present. If so, control transfers to 812; otherwise, control transfers to 816. New microcontroller code may have been programmed into the external flash via a serial connection to the microcontroller, which initiated a set of microcontroller flash programming instructions. The flash programming instructions perform flash programming to the external flash device.

In various implementations, the serial connection to the microcontroller may be via the programmable logic device (PLD). Further, the flash programming pins of the microcontroller may be connected to the external flash device via the PLD. The external flash may be large enough to accommodate two copies of the microcontroller code—the old microcontroller code and the new microcontroller code. In this way, if the new microcontroller code is loaded and has an error, the old microcontroller code will still be available.

At 812, control checks whether the CRC (cyclic redundancy check) or other verification parameter is valid for the new code. If so, control transfers to 820; otherwise, control transfers to 816. At 820, control copies the new code from the external flash memory to internal flash storage. At 824, control determines whether the CRC or other verification measure is valid for the new code stored in internal flash. If so, control transfers to 816; otherwise, control transfers to 828.

At 828, because the new code failed a consistency or authenticity check, control copies the original (old) code from the external flash to internal flash. Control then continues at 816. At 816, control executes code from internal flash. While this process has been described in the context of the boot code loading new main microcontroller code, the reverse can also be performed, where the main microcontroller code verifies and then updates the boot code.

In various implementations, the boot code is designed to be simple and concise to avoid the need to frequently update the boot code. In fact, in some implementations, updating the boot code may be disallowed.

At 840, control determines whether new FPGA code is available. If so, control transfers to 844; otherwise, control transfers to 848. At 848, no new FPGA code is available and therefore control continues executing code from the internal flash storage. Once code execution is completed, such as upon a power down event, control ends.

Meanwhile, at 844, control loads the new FPGA code into memory. In some implementations, only a part of the new FPGA code may be loaded into memory. The new FPGA code may be stored in a reduced format compared to a standard SVF (serial vector format) file generally used by an in-circuit tester for programming a programmable logic device.

The SVF file may include human-readable text, where data is repeated between instructions even when that data remains the same. As a result, significant compression may be achieved over the standard SVF file. For example, an example SVF file is 503 kilobytes in size, while a compressed form is between 50 and 60 kilobytes, corresponding to between an 8:1 and a 10:1 reduction.

Unlike standard compression algorithms, where a decompression step must first be performed before using the data, the reduced form of the present disclosure is directly usable for programming the PLD. As a result, control can directly select the first instruction within the reduced form code without having to perform a decompression step.

In various implementations, new code can be programmed into the FPGA while the FPGA is still operating under its previous programming. A final commit instruction or reset instruction then causes the FPGA to operate according to the new programming.

Control continues at 856, where control determines whether the selected instruction includes data. If so, control transfers to 860; otherwise, control transfers to 864. At 860, control stores a pointer to the data.

Control continues at 868, where control stores up to a predetermined unit of the data for the selected instruction. For example, the predetermined unit may be 32 bits. Therefore, control stores up to 32 bits of the included data in the instruction. If the instruction includes more than 32 bits, the stored data may include only the beginning, the end, or the middle of the instructions data.

Control then continues at 872, where the selected instruction is executed, which applies a PLD programming operation to the PLD. Control continues at 876, where there are additional instructions, control transfers to 880; otherwise, control returns to 848. At 880, control selects the next instruction and transfers to 856.

Meanwhile, at 864, control determines whether the selected instruction, which does not include data, requires data beyond the stored predetermined unit. If so, control transfers to 884; otherwise, control proceeds with 872. At 872, the selected instruction either does not require any data or requires only the data already stored within the predetermined unit. Meanwhile, at 884, control needs to retrieve additional data and therefore follows the pointer stored at 860. Control then continues at 872.

Figure 8B:
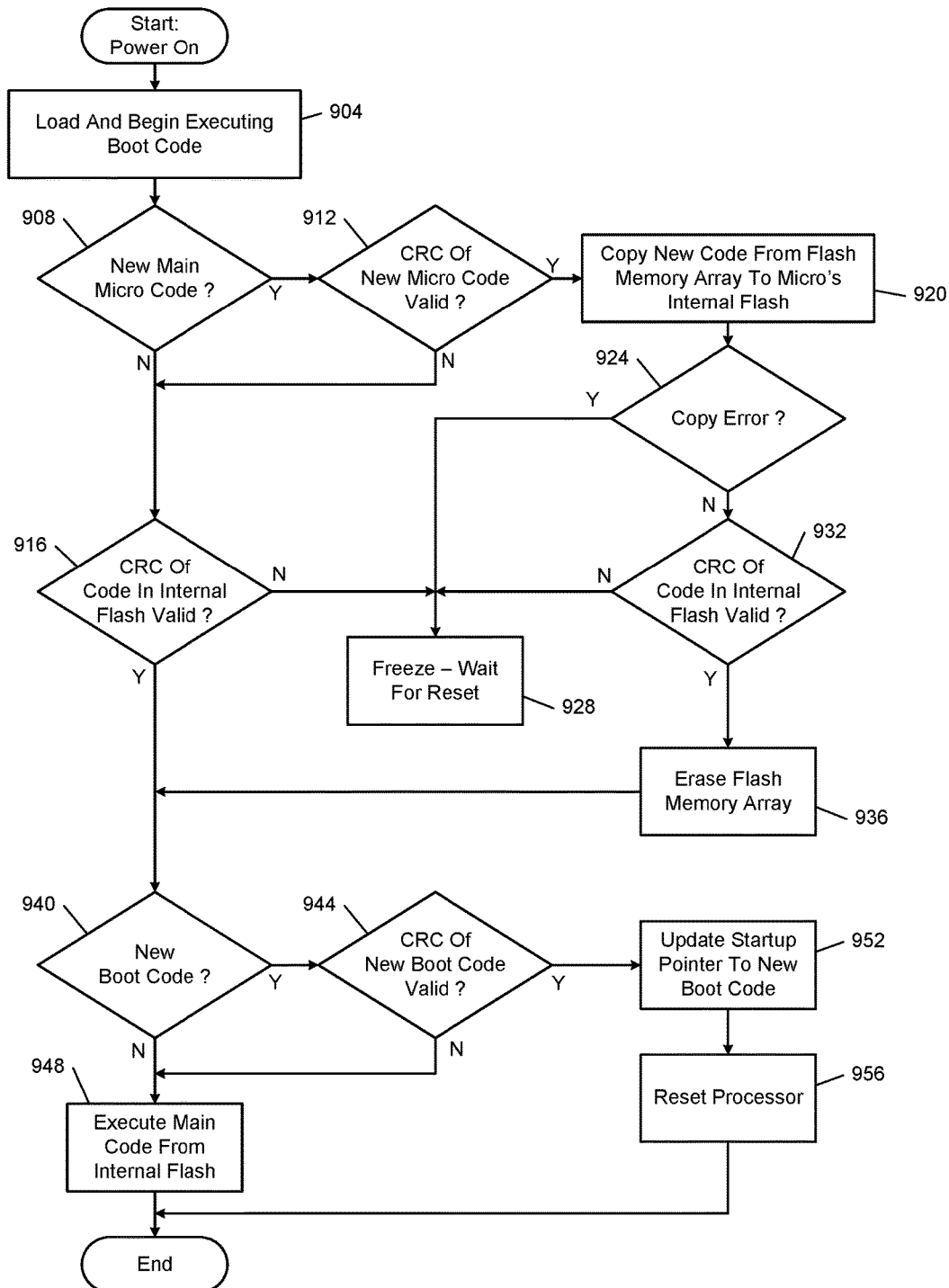

In FIG. 8B, control begins at 904 upon power-on of the microcontroller. The microcontroller loads boot code from internal flash into RAM and begins execution of the boot code. At 908, the boot code determines whether new main microcontroller code is present in the external flash memory array. If so, control transfers to 912; otherwise, control transfers to 816.

At 912, control checks whether the CRC (cyclic redundancy check) or other verification parameter is valid for the new main code. If so, control transfers to 920; otherwise, control transfers to 916. At 920, control copies the new code from the external flash memory to internal flash storage. At 924, if a copy error occurred during the copy, control transfers to 928. Otherwise, control transfers to 932. At 932, control determines whether the CRC or other verification measure is valid for the code stored in internal flash. If so, control transfers to 936; otherwise, control transfers to 928. At 936, control erases the copied code from the external flash memory array so the boot code doesn't attempt to re-load the new code on the next boot. Control then continues at 940.

At 916, control determines whether the CRC or other verification parameter is valid for the main code stored in the internal flash of the microcontroller. If so, control transfers to 940. Otherwise, control transfers to 928. At 928, control enters an indefinite freeze, awaiting the microcontroller to be reset. This reset may be performed manually by an operator interacting with the system in which the microcontroller is present, or may be performed automatically, such as by a watchdog timer.

At 940, control determines whether new boot code is present in internal flash. For example, the main code of the microcontroller may write new boot code to internal flash. If new boot code is present in internal flash, control transfers to 944; otherwise, control transfers to 948. For example only, control may determine that new boot code is present by comparing a version number of the other boot code to the currently-executing boot code. Because of the relatively smaller size of the boot code, two copies of the boot code may reside in the internal flash at all times.

While not described in FIG. 8B, if startup fails using one set of boot code, the microcontroller may reset and attempt startup using the other set of boot code. For example, at the beginning of the boot code, the boot code may point the microcontroller to the alternate set of boot code, and upon successful operation of the boot code, before transferring to main code, the boot code may point the microcontroller back to the successfully-completing boot code.

At 944, control determines whether the CRC of the new boot code is valid. If so, control transfers to 952. Otherwise, control transfers to 948. At 952, control updates a non-volatile indication of the microcontroller to start next time using the new boot code. For example, the microcontroller may have a non-volatile register pointing to a start address of the boot code. Control continues at 956, where the processor is reset. Control thereby ends upon processor reset.

At 948, boot code transitions to execute main code from internal flash. Boot control depicted in FIG. 8B then ends. PLD updating, such as is depicted in reference numerals 840-884 of FIG. 8A, may be a function of the main code.

Display and PFC Switch Control

Figure 9:
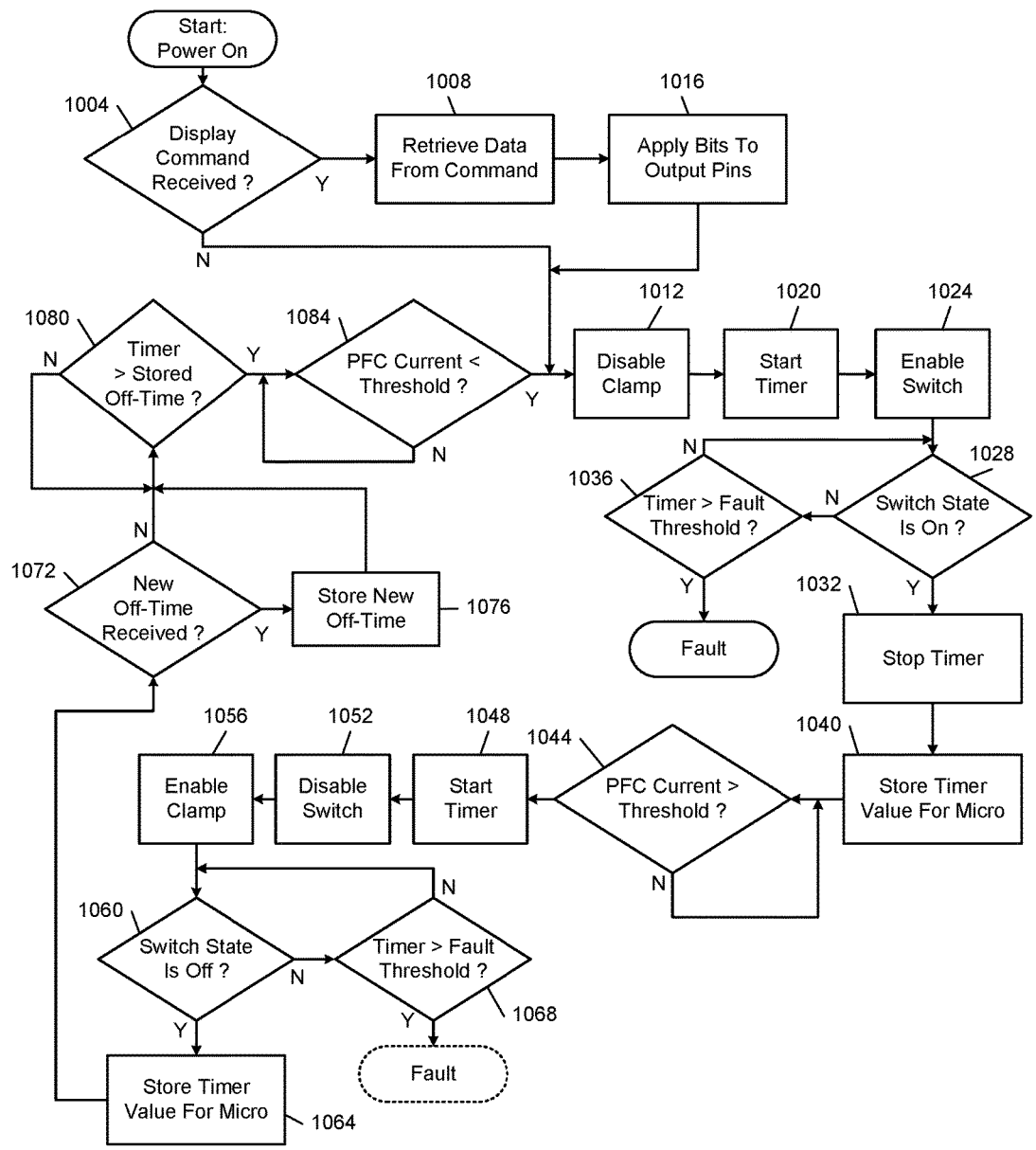
FIG. 9 is a flowchart of example operation of selected components of the programmable logic device.

In FIG. 9, example operation of the PLD for the display grid and PFC switch control is presented. Control begins at 1004 upon power-on. If a display command is received, control transfers to 1008; otherwise, control transfers to 1012. At 1008, control retrieves data from the display command.

At 1016, control applies each bit of data to a respective output pin. For example, a grid of five rows and seven columns can be driven with twelve bits. Each time a twelve-bit data packet is received for the display, a new column can be selected based on the 7 column pins and between 0 and 5 LEDs in that column can be illuminated based on the five row pins. In various implementations, because the column selection is one-hot, a decoder can be used to turn a binary value into a bit field with a single binary one. Control then continues at 1012.

At 1012, the switch, such as for a boost convertor in a PFC circuit, will be enabled and therefore any clamping is disabled. A clamp may prevent the control terminal (such as a gate) of the switch from moving to an enabled voltage. Control continues at 1020, where a timer is started. At 1024, the switch is enabled. Control continues at 1028, where if a closed-loop reading of the switch state is on, control transfers to 1032; otherwise, control transfers 1036.

At 1036, if the timer has exceeded a fault threshold, control reports a fault and ends. Otherwise, control continues at 1028. The fault threshold may be based on a length of time in which the enabled switch should have been able to turn on. If the switch does not appear to have turned on, measurement of the switch may be faulty or the switch may be oscillating at a high frequency than the switch can maintain for an extended period of time. Therefore, the PFC may be shut down.

At 1032, control stops the timer, which now indicates a delay between enabling a switch and the state of the switch appearing to be on. Control continues at 1040, where control stores the timer value for later retrieval by the microcontroller. The microcontroller can send a read request to the PLD to retrieve the on delay.

Control continues at 1044, where control remains until the PFC current (that is, the current through the inductor) exceeds a threshold. Once the PFC current exceeds the threshold, control transfer s to 1048, where control starts a timer from zero. At 1052, control disables the switch. At 1056, control enables the clamp, which drives the control terminal of the switch to the inactive state.

At 1060, control determines whether the switch state appears to be off. If so, control transfers to 1064; otherwise, control transfers 1068. At 1068, if the timer exceeds a fault threshold, control reports a fault and ends. Otherwise, control returns to 1060. At 1064, control stores the value of the timer, which now holds the length of time between disabling the switch and determining that the switch state is off. The microcontroller can retrieve this value.

Control continues at 1072, where if a new off-time is received, control transfers to 1076; otherwise, control transfers to 1080. At 1080, control determines whether the timer is greater than the stored off-time. If so, control transfers to 1084; otherwise, control remains in 1080. At 1084, control determines whether the PFC current has fallen below the threshold. If so, control transfers to 1012, otherwise, control remains at 1084. The threshold in 1084 may be the same as the threshold in 1044; in other implementations, there may be some hysteresis. The tests in 1044 and 1084 may be implemented using a comparator.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A circuit for driving a motor of a compressor, the circuit comprising:
   a microcontroller configured to generate a reference current value for a power factor correction (PFC) converter; and
   a programmable logic device configured to:
      receive control messages from the microcontroller;
      in response to receiving a first control message from the microcontroller, set a value into an off-time register based on data in the first control message;
      control a power switch of the PFC converter to turn off in response to receiving a comparison signal indicating that a measured current in the PFC converter exceeds the reference current value; and
      subsequent to controlling the power switch to turn off, wait for a period of time determined by the off-time register before controlling the power switch to turn on.

2. The circuit of claim 1 wherein the programmable logic device is configured to control the power switch to turn on once both (i) the period of time has expired and (ii) the comparison signal indicates that the measured current does not exceed the reference current value.

3. The circuit of claim 1 further comprising an analog comparator configured to output the comparison signal based on a comparison between (i) an analog signal representative of the reference current value and (ii) an analog signal representative of the measured current in the PFC converter.

4. The circuit of claim 1 wherein the programmable logic device is configured to measure at least one of a turn-off delay of the power switch and a turn-on delay of the power switch.

5. The circuit of claim 4 wherein the programmable logic device is configured to selectively transmit at least one of the measured turn-off delay and the measured turn-on delay to the microcontroller.

6. The circuit of claim 4 further comprising:
a comparator configured to compare (i) a first signal indicating a voltage across the power switch and (ii) a first threshold,
wherein the programmable logic device is configured to measure the turn-on delay of the power switch as a delay between (i) controlling the power switch to turn on and (ii) the comparator indicating that the first signal exceeds the first threshold.

7. The circuit of claim 1 wherein the programmable logic device is configured to:
receive a second message of the control messages, wherein the second message includes a plurality of bits; and
drive values of the plurality of bits respectively onto a plurality of pins that corresponds one-to-one to the plurality of bits.

8. The circuit of claim 1 wherein:
the microcontroller is configured to program the programmable logic device using a programming file encoded in a compressed file format; and
the compressed file format includes serialized instructions for execution by the microcontroller without performing a decompression operation to recover the programming file.

9. The circuit of claim 1 wherein:
the microcontroller includes an operational amplifier, a comparator, and a dedicated pin;
the operational amplifier is configured to sample the measured current;
the comparator is configured to compare the measured current from the operational amplifier to the reference current value and assert the comparison signal in response to the measured current exceeding the reference current value; and
the comparison signal is output from the microcontroller on the dedicated pin.

10. The circuit of claim 1 wherein:
the microcontroller includes a first serial interface;
the programmable logic device includes:
a second serial interface in communication with the first serial interface, and
a dedicated pin;
the programmable logic device is configured to receive the control messages from the microcontroller via the second serial interface; and
the programmable logic device is configured to receive the comparison signal on the dedicated pin.

11. A control method for a programmable logic device, the method comprising:
in response to the programmable logic device receiving a first control message from a microcontroller, setting a value based on data in the first control message into an off-time register of the programmable logic device;
in response to the programmable logic device receiving a comparison signal indicating that a measured current in a power factor correction (PFC) converter exceeds a reference current value, (i) controlling, using the programmable logic device, a power switch of the PFC converter to turn off and (ii) starting a timer; and
controlling, using the programmable logic device, the power switch to turn on in response to a value of the timer reaching the value in the off-time register.

12. The method of claim 11 further comprising controlling the power switch to turn on once both (i) the value of the timer reaches the value in the off-time register and (ii) the comparison signal indicates that the measured current does not exceed the reference current value.

13. The method of claim 11 further comprising generating the comparison signal based on a comparison between (i) an analog signal representative of the reference current value and (ii) an analog signal representative of the measured current in the PFC converter.

14. The method of claim 11 further comprising measuring, using the programmable logic device, at least one of a turn-off delay of the power switch and a turn-on delay of the power switch.

15. The method of claim 14 further comprising selectively transmitting at least one of the measured turn-off delay and the measured turn-on delay from the programmable logic device to the microcontroller.

16. The method of claim 14 wherein:
the method further comprises comparing (i) a first signal indicating a voltage across the power switch and (ii) a first threshold; and
the turn-on delay of the power switch is measured as a delay between (i) controlling the power switch to turn on and (ii) the first signal exceeding the first threshold.

17. The method of claim 11 further comprising:
receiving, using the programmable logic device, a second control message including a plurality of bits; and
driving, using the programmable logic device, values of the plurality of bits respectively onto a plurality of pins that corresponds one-to-one to the plurality of bits.

18. The method of claim 11 further comprising programming, using the microcontroller, the programmable logic device using a programming file encoded in a compressed file format, wherein the compressed file format includes serialized instructions that are executable by the microcontroller without performing a decompression operation to recover the programming file.

19. The method of claim 11 further comprising:
sampling the measured current measuring using an operational amplifier;
comparing, using a comparator of the microcontroller, the measured current to the reference current value;
asserting the comparison signal in response to the measured current exceeding the reference current value; and
outputting, on a first dedicated pin of the microcontroller, the comparison signal.

20. The method of claim 11 further comprising:
receiving, on a dedicated pin of the programmable logic device, the comparison signal; and
receiving, via a first serial interface of the programmable logic device, control messages from a second serial interface of the microcontroller, wherein the first serial interface is physically distinct from the dedicated pin.

* * * * *